US011590676B2

United States Patent
Hudson et al.

(10) Patent No.: US 11,590,676 B2
(45) Date of Patent: Feb. 28, 2023

(54) GUIDED WAVE-BASED SYSTEM FOR CURE MONITORING OF COMPOSITES USING PIEZOELECTRIC DISCS AND FIBER BRAGG GRATINGS/PHASE-SHIFTED BRAGG GRATINGS

(71) Applicant: United States of America as represented by the Administrator of NASA, Washington, DC (US)

(72) Inventors: Tyler B. Hudson, Suffolk, VA (US); Fuh-Gwo Yuan, Cary, NC (US); Nicolas Auwaijan, Lake Forest, CA (US); Frank L. Palmieri, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 807 days.

(21) Appl. No.: 16/109,313

(22) Filed: Aug. 22, 2018

(65) Prior Publication Data
US 2020/0061874 A1    Feb. 27, 2020

Related U.S. Application Data

(60) Provisional application No. 62/720,449, filed on Aug. 21, 2018.

(51) Int. Cl.
*B29C 35/02* (2006.01)
*G01D 5/353* (2006.01)
(Continued)

(52) U.S. Cl.
CPC ..... *B29C 35/0288* (2013.01); *G01D 5/35383* (2013.01); *B29K 2101/10* (2013.01); *B29K 2105/0881* (2013.01); *B29K 2307/04* (2013.01)

(58) Field of Classification Search
CPC .. B29C 35/0288; G01D 5/35383; G01L 1/246
See application file for complete search history.

(56) References Cited

U.S. PATENT DOCUMENTS

2013/0341497 A1*  12/2013  Zuardy ................. G01L 1/242
                                                            250/227.14
2018/0079155 A1*  3/2018  Hudson .................. B29C 70/546

OTHER PUBLICATIONS

V.M. Murukeshan, P.Y. Chan, L.S. Ong, L.K. Seah; Cure monitoring of smart composites using Fiber Bragg Grating based embedded sensors; Sensors and Actuators 79(2) Feb. 2000 pp. 153-161 (Year: 2000).*

(Continued)

*Primary Examiner* — Joseph S Del Sole
*Assistant Examiner* — John Robitaille
(74) *Attorney, Agent, or Firm* — Jennifer L. Riley; Robin W. Edwards; Trenton J. Roche

(57) ABSTRACT

System and method for in-process cure monitoring of a material utilizes one or more sensors such as fiber Bragg gratings (FBGs) or phase-shifted FBGs (PS-FBGs) and at least one optical line fiber connected to the sensor(s). The sensor(s) and the optical line may be embedded in the material prior to curing the material may comprise a fiber reinforced polymer. Waves are excited into the material during curing thereof to form guided waves that propagate through the material. At least one wave metric of the guided waves is measured utilizing the sensor(s).

20 Claims, 18 Drawing Sheets
(5 of 18 Drawing Sheet(s) Filed in Color)

(51) Int. Cl.
B29K 105/08 (2006.01)
B29K 101/10 (2006.01)
B29K 307/04 (2006.01)

(56) References Cited

OTHER PUBLICATIONS

Hudson, T. B., et al.,"Automated in-process cure monitoring of composite laminates using a guided wave-based system with high temperature piezoelectric transducers," Journal of Nondestructive Evaluation, Diagnostics and Prognostics of Engineering Systems, 2018, vol. 1, pp. 021008-1-02108-8.
Hudson, T. B., et al. "Development of a fully automated guided wave system for in-process cure monitoring of CFRP composite laminates," Paper presented at the American Society for Composites: Thirty-First Technical Conference, 2016, pp. 1-10, Williamsburg, VA.
Hudson, T. B., et al., "Detection of CFRP composite manufacturing defects using a guided wave approach," Paper presented at the SAMPE Technical Conference, 2015, pp. 1-16, Baltimore, MD.
Jeong, H., "Analysis of plate wave propagation in anisotropic laminates using a wavelet transform," NDT & E International, 2001, pp. 185-190, vol. 34, Issue 3.
Jeong, H., "Experimental analysis of porosity-induced ultrasonic attenuation and velocity change in carbon composites," Ultrasonics, 1995, pp. 195-203, vol. 33, Issue 3.
Kaelble, D., "Dynamic and tensile properties of epoxy resins," Journal of Applied Polymer Science, 1965, pp. 1213-1225, vol. 9, Issue 4.
Kazys, R., et al.,"Air-coupled ultrasonic investigation of multi-layered composite materials," Ultrasonics, 2006, pp. e819-e822, 44.
Kirkby, E., et al., "Impact localisation with FBG for a self-healing carbon fibre composite structure," Composite Structures, 2011, pp. 8-14, Issue 94.
Kurashima, T., et al., "Distributed-temperature sensing using stimulated Brillouin scattering in optical silica fibers," Optics Letters, 1990, pp. 1038-1040, vol. 15, Issue 18.
Leckey, C. A., et al., "Guided waves in anisotropic and quasi-isotropic aerospace composites: Three-dimensional simulation and experiment," Ultrasonics, 2014, pp. 385-394, Issue 54.
Liebers, N., et al., "Effective and flexible ultrasound sensors for cure monitoring for industrial composite production" Deutsche Gesellschaft für Luft-und Raumfahrt-Lilienthal-Oberth eV, 2012, pp. 1-6.
Lindrose, A. M., "Ultrasonic wave and moduli changes in a curing epoxy resin," Experimental Mechanics, 1978, pp. 227-232, vol. 18, Issue 6.
Lionetto, F., et al., "Phase transformations during the cure of unsaturated polyester resins," Materials Science and Engineering, 2004, pp. 284-287, vol. 370, Issue 1.
Lionetto, F., et al., "Monitoring the cure state of thermosetting resins by ultrasound," Materials, 2013, pp. 3783-3804, vol. 6, Issue 9.
Lionetto, F., et al., "Monitoring the cure state of thermosetting resins by ultrasound," Materials, 2013b, pp. 3783-3804, vol. 6, Issue 9.
Lionetto, F., et al., "Air-coupled ultrasound: A novel technique for monitoring the curing of thermosetting matrices," IEEE Transactions on Ultrasonics, Ferroelectrics and Frequency Control, 2007, pp. 1437-1444, vol. 54, Issue 7.
London, Y., et al., "High-resolution distributed fiber-optic monitoring of composite beams production," Paper presented at the International Workshop on Structural Health Monitoring, 2015, pp. 1-8, Stanford, CA.
London, Y., et al., "High-resolution long-range distributed Brillouin analysis using dual-layer phase and amplitude coding," Optics Express, 2014, pp. 27144-27158, vol. 22, Issue 22.
Wu, Q., et al., "Acoustic emission detection and position identification of transverse cracks in carbon fiber-reinforced plastic laminates by using a novel optical fiber ultrasonic sensing system," Structural Health Monitoring, 2014, pp. 1-9, vol. 14, Issue 3.

Luyckx, G., et al., "Strain measurements of composite laminates with embedded fibre Bragg gratings: Criticism and opportunities for research," Sensors, 2010, pp. 384-408, vol. 11, Issue 1.
Maass, D. P., "Development of a testbed for automated ply inspection of composites," Paper presented at the SAMPE Technical Conference, 2015, pp. 123-139, Baltimore, MD.
Maffezzoli, A., et al., "Cure monitoring of epoxy matrices for composites by ultrasonic wave propagation," Journal of Applied Polymer Science, 1999, pp. 1969-1977, vol. 73, Issue 10.
McIlhagger, A., et al., "The development of a dielectric system for the on-line cure monitoring of the resin transfer moulding process," Composites Part A: Applied Science and Manufacturing, 2000, pp. 1373-1381, vol. 31, Issue 12.
Zadok, A., et al., "Random-access distributed fiber sensing," Laser & Photonics Reviews, 2012, pp. 1-5, vol. 6, Issue 5.
Michaels, J. E., et al., "Chirp excitation of ultrasonic guided waves," Ultrasonics, 2013, pp. 265-270, vol. 53.
Michaels, T. E., "Frequency-wavenumber domain analysis of guided wavefields," Ultrasonics, 2011, pp. 452-466, vol. 51, Issue 4.
Minakuchi, S., et al., "Composite cure simulation scheme fully integrating internal strain measurement," Composites Part A: Applied Science and Manufacturing, 2016, pp. 53-63, Issue 84.
Miya, T., et al., "Ultimate low-loss single-mode fibre at 1.55 µm," Electronics Letters, 1979, pp. 106-108, Vo. 15, Issue 4.
Musto, P., et al., "A study by Raman, near-infrared and dynamic-mechanical spectroscopies on the curing behaviour, molecular structure and viscoelastic properties of epoxy/anhydride networks," Polymer, 2007, pp. 3703-3716, vol. 48, Issue 13.
Nixdorf, K., et al., "The dielectric properties of glass-fibre-reinforced epoxy resin during polymerisation," Composites Science and Technology, 2001, pp. 889-894, vol. 61, Issue 6.
Okabe, Y., et al., "Delamination detection in composite laminates using dispersion change based on mode conversion of Lamb waves," Smart Materials and Structures, 2010, Structure, pp. 1-12, vol. 19, Issue 115013.
Okabe, Y., etal., "Detection of microscopic damages in composite laminates with embedded small-diameter fiber Bragg grating sensors," Composites Science and Technology, 2002, pp. 951-958, vol. 62, Issue 7.
Okabe, Y., et al., "Detection of transverse cracks in CFRP composites using embedded fiber Bragg grating sensors," Smart Materials and Structures, 2000, pp. 832, vol. 9, Issue 6.
Zhu, R., et al., "Fast damage imaging using the time-reversal technique in the frequency-wavenumber domain," Smart Materials and Structures, 2013, pp. 1-11, vol. 22.
Pavlakovic, B., "DISPERSE: A general purpose program for creating dispersion curves," Review of progress in quantitative nondestructive evaluation, 1997, pp. 185-192, vol. 16.
Peled, Y., et al., "Monitoring the propagation of mechanical waves using an optical fiber distributed and dynamic strain sensor based on BOTDA," Optics Express, 2013, pp. 10697-10705, vol. 21, Issue 9.
Perez, I., et al., "Acoustic emission detection using fiber Bragg gratings," Paper presented at the SPIE's 8th Annual International Symposium on Smart Structures and Materials, 2001, pp. 209-215, Newport Beach, CA.
Peters, K., "Measurement Principle" MAE 546, Unpublished manuscript, Fall 2013.
Prime, R. B., "Differential scanning calorimetry of the epoxy cure reaction," Polymer Engineering & Science, 1973, pp. 365-371, vol. 13, Issue 5.
Raisutis, R., et al., "Ultrasonic air-coupted testing of square-shape CFRP composite rods oy means of guided waves," NDT & E International, 2011, pp. 645-654, vol. 44, Issue 7.
Rudberg, T., et al., "Incorporation of laser projectors in machine cell controller reduces ply boundary inspection time, on-part course identification and part probing," SAE International Journal of Aerospace, 2012, pp. 75-78, vol. 5.
Ruzzene, M., "Frequency-wavenumber domain filtering for improved damage visualization," Smart Materials and Structures, 2007, pp. 2116-2129, vol. 16, Issue 6.
Sanchez, D. M., et al., "Distributed internal strain measurement during composite manufacturing using optical fibre sensors," Composites Science and Technology, 2015, pp. 49-57, Issue 120.

(56) References Cited

OTHER PUBLICATIONS

Schmidt, C., et al., "Evaluation of eddy current testing for quality assurance and process monitoring of automated fiber placement," Composites Part B: Engineering, 2014, pp. 109-116, Issue 56.

Shiloh, L., et al., "Distributed acoustic and vibration sensing via optical fractional fourier transform reflectometry," Optics Express, 2015, pp. 4296-4306, vol. 23, Issue 4.

Shimizu, T., et al., "Strain measurement using a Brillouin optical time domain reflectometer for development of aircraft structure health monitoring system," Paper presented at the 6th Annual International Symposium on NDE for Health Monitoring and Diagnostics, 2001, pp. 312-322, Newport Beach, CA.

Sohn, H., et al., "Wavelet-based active sensing for delamination detection in composite structures," Smart Materials and Structures, 2004, pp. 153-160, vol. 13, Issue 1.

Song, K. Y., et al., "Distributed strain measurement with millimeter-order spatial resolution based on Brillouin optical correlation domain analysis," Optics Letters, 2006, pp. 2526-2528, vol. 31, Issue 17.

Speake, J., et al., "Measurement of the cure of resins by ultrasonic techniques," Journal of Physics D: Applied Physics, 1974, pp. 412-424, vol. 7, Issue 3.

Sreekantamurthy, T., et al., "Composite cure process modeling and simulations using COMPRO® and validation of residual strains using fiber optics sensors," Paper presented at the American Society for Composites: Thirty-First Technical Conference, 2016, pp. 1-17, Williamsburg, VA.

Wu, Q., et al., "Investigation of dynamic properties of erbium fiber laser for ultrasonic sensing," Optics Express, 2014, pp. 8405-8419, vol. 22, Issue 7.

Stone, D., et al., "Ultrasonic attenuation as a measure of void content in carbon-fibre reinforced plastics," Non-Destructive Testing, 1975, pp. 137-145, vol. 8, Issue 3.

Takahashi, N., et al., "Underwater acoustic sensor with fiber Bragg grating," Optical Review, 1997, pp. 691-694, vol. 4, Issue 6.

Takeda, N., et al., "Development of smart composite structures with small-diameter fiber Bragg grating sensors for damage detection: Quantitative evaluation of delamination length in CFRP laminates using Lamb wave sensing," Composites Science and Technology, 2005, pp. 2575-2587, vol. 65, Issue 15.

Takeda, S., "Delamination detection in CFRP laminates with embedded small-diameter fiber Bragg grating sensors," Composites Part A: Applied Science and Manufacturing, 2002, pp. 971-980, vol. 33, Issue 7.

Tian, Z., et al., "Lamb wave frequency-wavenumber analysis and decomposition," Journal of Intelligent Material Systems and Structures, 2014, pp. 1107-1123, vol. 25, Issue 9.

Wu, Q., et al., "Application of a novel optical fiber sensor to detection of acoustic emissions by various damages in CFRP laminates," Smart Materials and Structures, 2014, Structure 24-015011.

Tsuda, H., et al., "Strain and damage monitoring of CFRP in impact loading using a fiber Bragg grating sensor system," Composites Science and Technology, 2007, pp. 1353-1361, vol. 67, Issue 7.

Vyazovkin, S., et al., "Mechanism and kinetics of epoxy-amine cure studied by differential scanning calorimetry," Macromolecules, 1996, pp. 1867-1873, vol. 29, Issue 6.

Wu, Q., et al., "High-sensitivity ultrasonic phase-shifted fiber Bragg grating balanced sensing system," Optics Express, 2012, pp. 28353-28362, vol. 20, Issue 27.

Wu, Q., et al., "Ultrasonic sensor employing two cascaded phase-shifted fiber Bragg gratings suitable for multiplexing," Optics Letters, 2012b, pp. 3336-3338, vol. 37, Issue 16.

Wu, Q., et al., "Novel real-time acousto-ultrasonic sensors using two phase-shifted fiber Bragg gratings," Journal of Intelligent Material Systems and Structures, 2014, pp. 640-646, vol. 25, Issue 5.

Wu, Q., et al., "Sensitivity distribution properties of a phase-shifted fiber Bragg grating sensor to ultrasonic waves," Sensors, 2014, pp. 1094-1105, vol. 14, Issue 1.

Wu, Q., et al., "Acoustic emission detection and position identification of transverse cracks in carbon fiber-reinforced plastic laminates by using a novel optical fiber ultrasonic sensing system," Structural Health Monitoring, 2014, pp. 205-213, vol. 14, Issue 3.

Zadok, A., et al., "Random-access distributed fiber sensing," Laser & Photonics Reviews, 2012, pp. L1-L5, vol. 6, Issue 5.

Adams, R., et al., "A review of defect types and nondestructive testing techniques for composites and bonded joints," NDT International, 1988, pp. 208-222, vol. 21, Issue 4.

Agrawal, G. P., et al., "Phase-shifted fiber Bragg gratings and their application for wavelength demultiplexing," IEEE Photonics Technology Letters, 1994, pp. 995-997, vol. 6, Issue 8.

An, Y., et al., "Complete noncontact laser ultrasonic imaging for automated crack visualization in a plate," Smart Materials and Structures, 2013, Structure 2-025022.

Antonucci, V., et al., "Real time monitoring of cure and gelification of a thermoset matrix," Composites Science and Technology, 2006, pp. 3273-3280, vol. 66, Issue 16.

Aronhime, M. T., et al., "Time-temperature-transformation (TTT) cure diagram of thermosetting polymeric systems," K. Dusek (Ed.), Epoxy resins and composites III, 1986, pp. 83-113, Springer-Verlag.

Aust, J. F., et al., "In situ analysis of a high-temperature cure reaction in real time using modulated fiber-optic FT-Raman spectroscopy," Applied Spectroscopy, 1999, pp. 682-686, vol. 53, Issue 6.

Barton, J. M., "The application of differential scanning calorimetry (DSC) to the study of epoxy resin curing reactions," K. Dusek (Ed.), Epoxy resins and composites I, 1985, pp. 111-154.

Beakou, A., et al., "Modelling slit tape buckling during automated prepreg manufacturing: A local approach," Composite Structures, 2011, pp. 2628-2635, vol. 93, Issue 10.

Belhaj, M., et al., "Dry fiber automated placement of carbon fibrous preforms," Composites Part B: Engineering, 2013, pp. 107-111, Issue 50.

Betz, et al., "Acousto-ultrasonic sensing using fiber Bragg gratings," Smart Materials and Structures, 2003, pp. 122, Structure 12-122.

Birt E., et al., "A review of NDE methods for porosity measurement in fibre-reinforced polymer composites," Insight-Non-Destructive Testing and Condition Monitoring, 2004, pp. 681-686, vol. 46, Issue 11.

Bolognini, G., et al., "Analysis of distributed temperature sensing based on Raman scattering using OTDR coding and discrete Raman amplification," Measurement Science and Technology, 2007, pp. 18-3211.

Chakrapani, et al., "Detection and characterization of waviness in unidirectional GFRP using Rayleigh wave air coupled ultrasonic testing (RAC-UT)," Research in Nondestructive Evaluation, 2013, pp. 191-201, vol. 24, Issue 4.

Chen, J., et al., "Fiber-optic and ultrasonic measurements for in-situ cure monitoring of graphite/epoxy composites," Journal of Composite Materials, 1999, pp. 1860-1881, vol. 33, Issue 20.

Chimenti, D., et al., "Nondestructive evaluation of composite laminates by leaky Lamb waves," Ultrasonics, 1991, pp. 13-21, Issue 29.

Coats, A., et al., Thermogravimetric analysis. A review. Analyst, 1963, pp. 906-924, vol. 88, Issue 1053.

Compton, D. A., et al., "In situ FT-IR analysis of a composite curing reaction using a mid-infrared transmitting optical fiber," Applied Spectroscopy, 1988, pp. 972-979, vol. 42, Issue 6.

Cooper, J. B., et al., "Modulated FT-Raman fiber-optic spectroscopy: A technique for remotely monitoring high-temperature reactions in real-time," Analytical Chemistry, 1997, pp. 1973-1978, vol. 69, Issue 11.

Coppola, G., et al., "Analysis of feasibility on the use of fiber Bragg grating sensors as ultrasound detectors," Paper presented at the SPIE's 8th Annual International Symposium on Smart Structures and Materials, 2001, pp. 224-232, Newport Beach, CA.

Dakin, J., et al., "Optical fiber sensors: Principles and components," 1988, pp. 1-42, pp. 78-96, pp. 132-183, pp. 200-248, pp. 360-479, vol. 1, Boston, MA: Artech House.

De Bruyne, N., "The adhesive properties of epoxy resins," Journal of Applied Chemistry, 1956, pp. 303-310, vol. 6, Issue 7.

Denisov, A., et al., "1'000'000 resolved points along a Brillouin distributed fibre sensor," Paper presented at the 23rd International Conference on Optical Fibre Sensors, 2014, Santander, Spain, 9157D2.

(56) References Cited

OTHER PUBLICATIONS

Dewynter-Marty, V., et al., "Embedded fiber Bragg grating sensors for industrial composite cure monitoring," Journal of Intelligent Material Systems and Structures, 1998, pp. 785-787, vol. 9, Issue 10.

Di Sante, R., "Fibre optic sensors for structural health monitoring of aircraft composite structures: Recent advances and applications," Sensors, 2015, pp. 18666-18713, vol. 15, Issue 8.

Dirk, H. L., et al., "The engineering aspects of automated prepreg layup: History, present and future," Composites Part B: Engineering, 2012, pp. 997-1009, vol. 43, Issue 3.

Dong, Y., et al., "2 cm spatial-resolution and 2 km range Brillouin optical fiber sensor using a transient differential pulse pair," Applied Optics, 2012, pp. 1229-1235, vol. 51, Issue 9.

Ee, D. V., et al., "HexPly 8552 material properties database for use with COMPRO CCA and RAVEN," http://www.niar.wichita.edu/coe/ncamp_documents/ Hexcel%208552/Hexcel8552Material-CharacterizationBinderV0-9.pdf, 2009., accessed Mar. 25, 2022.

Elooz, D., et al., "High-resolution long-reach distributed Brillouin sensing based on combined time-domain and correlation-domain analysis," Optics Express, 2014, pp. 6453-6463, vol. 2.2, Issue 6.

Ersoy, N., et al.,"Development of the properties of a carbon fibre reinforced thermosetting composite through cure," Composites Part A: Applied Science and Manufacturing, 2010, pp. 401-409, vol. 41, Issue 3.

Erosy, N., et al., "Development of spring-in angle during cure of a thermosetting composite," Composites Part A: Applied Science and Manufacturing, 2005, pp. 1700-1706, vol. 36, Issue12.

Ersoy, N., et al., "An experimental method to study the frictional processes during composites manufacturing," Composites Part A: Applied Science and Manufacturing, 2005, pp. 1536-1544, vol. 36, Issue 11.

Farquharson, S., et al., "Development of a phase diagram to control composite manufacturing using Raman spectroscopy," Paper presented at the Optical Technologies for Industrial, Environmental, and Biological Sensing, 2004, pp. 19-29, Providence, RI.

Fava, R.,"Differential scanning calorimetry of epoxy resins," Polymer, 1968, pp. 137-151, 9.

Fellay, A., et al., "Distributed sensing using stimulated Brillouin scattering: Towards ultimate resolution," Paper presented at the Optical Fiber Sensors, 1997, OWD3, Williamsburg, VA.

Fisher, N. E., et al., "Ultrasonic field and temperature sensor based on short in-fibre Bragg gratings," Electronics Letters, 1998, pp. 1139-1140, vol. 34, Issue 11.

Foaleng, S. M., et al., "High spatial and spectral resolution long-range sensing using Brillouin echoes," Journal of Lightwave Technology, 2010, pp. 2993-3002, vol. 28, Issue 20.

George, G., et al.,"Real-time monitoring of the cure reaction of a TGDDM/DDS epoxy resin using fiber optic FT-IR," Journal of Applied Polymer Science, 1991, pp. 643-657, vol. 42, Issue 3.

Hudson, T. B., et al., "Imaging of local porosity/voids using a fully non-contact air-coupled transducer and laser Doppler vibrometer system," Structural Health Monitoring, 2016, pp. 164-173, vol. 16, Issue 2.

Gillham, J. K., "Formation and properties of thermosetting and high tg polymeric materials," Paper presented at the Makromolekulare Chemie Macromolecular Symposia, 1987, pp. 67-74, vol. 7.

Guemes, J., et al., "Response of Bragg grating fiber-optic sensors when embedded in composite laminates," Composites Science and Technology, 2002, pp. 959-966, vol. 62, Issue 7.

Guo, H., et al.,"Fiber optic sensors for structural health monitoring of air platforms," Sensors, 2011, pp. 3687-3705, vol. 11, Issue 4.

Harb, M. S., et al., "A rapid, fully non-contact, hybrid system for generating Lamb wave dispersion curves," Ultrasonics, 2015, pp. 62-70, vol. 61.

Harb, M. S., et al., "Impact damage imaging using non-contact ACT/LDV system," Paper presented at the International Workshop on Structural Health Monitoring, 2015, pp. 2567-2574, Stanford, CA.

Harb, M. S., et al., "Damage imaging using non-contact air-coupled transducer/laser Doppler vibrometer system," Structural Health Monitoring, 2016, pp. 193-203, vol. 15, Issue 2.

Hardis, R., et al., "Cure kinetics characterization and monitoring of an epoxy resin using DSC, Raman spectroscopy, and DEA," Composites Part A: Applied Science and Manufacturing, 2013, pp. 100-108, 49.

Harsch, M., et al., "Strain development in a filled epoxy resin curing under constrained and unconstrained conditions as assessed by fibre Bragg grating sensors," Express Polymer Letters, 2007, pp. 217-225, vol. 1, Issue 4.

Harsch, M., et al., "Influence of cure regime on the strain development in an epoxy resin as monitored by a fiber Bragg grating sensor," Macromolecular Materials and Engineering, 2007, pp. 474-483, vol. 292, Issue 4.

Hou, T. H.,"Cure cycle design methodology for fabricating reactive resin matrix fiber reinforced composites: A protocol for producing void-free quality laminates," NASA TM 2014-218524, 2014, pp. 1-16.

Hou, T. H., et al., "Chemorheology of an epoxy resin system under isothermal curing," Journal of Applied Polymer Science, 1990, pp. 819-834, vol. 41, Issues 3-4.

\* cited by examiner

GUIDED WAVE-BASED SYSTEM FOR CURE MONITORING OF COMPOSITES USING PIEZOELECTRIC DISCS AND FIBER BRAGG GRATINGS/PHASE-SHIFTED BRAGG GRATINGS

CROSS-REFERENCE TO RELATED PATENT APPLICATION(S)

This patent application claims the benefit of and priority to U.S. Provisional Patent Application No. 62/720,449 filed on Aug. 21, 2018, the contents of which is hereby incorporated by reference in its entirety.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Known cure monitoring techniques include differential scanning calorimetry
(DSC), rheology, dynamic mechanical analysis (DMA), and thermal gravimetric analysis (TGA). These material characterization techniques may be utilized to monitor thermo-physical and mechanical properties of a resin during cure. Typically, the techniques must be conducted on a small sample in a controlled laboratory instrument.

Another known cure monitoring technique, dielectric analysis (DEA), utilizes a loss factor, "6", to monitor the different phases of cure (e.g., in glass-fiber reinforced epoxy). The degree of cure measured from DEA correlates well with DSC and Raman spectroscopy for isothermal cure of in epoxy resins. During the resin transfer molding process, the maximum of the ionic conductivity indicated minimum viscosity. After viscosity reaches minimum, the first zero slope of the derivative of log of the ionic conductivity with respect to the cure time (DLIC) demarks the onset of gelation. DLIC also loosely correlated with degree of cure from onset of gelation to full cure and the DLIC plateau estimated vitrification when compared with DSC. Although these tests may be performed in a laboratory environment, DEA may be implemented to provide in-situ cure monitoring at production scale.

Conventional bulk wave ultrasound has also been implemented as a cure monitoring technique. For thermoset resins, ultrasonic velocity has been used to infer the degree of cure because of its association with the modulus of the resin. Bulk wave ultrasound, in pulse-echo mode, can monitor the completion of resin cure by measuring when the time delay plateaus (i.e., the ultrasonic velocity becomes a fixed value) in graphite/epoxy composites and epoxy matrices. Other ultrasonic phenomena have also been used for monitoring degree of cure including, attenuation (i.e., amplitude of signal), instantaneous phase, and the mean value of each frequency curve weighted by the maximum corresponding spectral amplitude." Both contact and air-coupled ultrasonic techniques have been employed for cure monitoring, with the latter negating the need for resin-transducer contact with the composite being monitored. Air-coupled ultrasonic cure monitoring, however, must account for the exothermal behavior of the cure process as well as the alteration of acoustic air path. Because the temperature varies greatly throughout the cure process, the speed of the sound wave in the air changes accordingly. This change in the speed of sound in air impacts the measured data because the transducers are not in direct contact with the composite, and changes in sound velocity must be accounted for to determine the correct time of flight in the composite.

BRIEF SUMMARY OF THE INVENTION

One aspect of the present disclosure is a method of in-process cure monitoring of a material. The material may comprise a fiber reinforced polymer matrix composite material or other material that experiences changes in material properties during curing r other processes. The method may include embedding at least one fiber Bragg grating (FBG) comprising a conventional FBG or a phase-shifted FBG (PS-FBG) and at least one optical line that is operatively connected to the FBG into a fiber reinforced polymer material. Alternatively, the FBG and/or the optical line may be disposed (e.g. bonded) to an exterior surface of the fiber reinforced polymer material. Waves are excited into the fiber reinforced polymer matrix material during curing of the polymer matrix material at a first location to form guided waves that propagate through the fiber reinforced polymer matrix material. The waves may be formed by a powered actuator such as a piezoelectric device that is disposed (e.g. bonded) to a surface of the fiber reinforced polymer material. The method further includes causing light to propagate through the optical line, and measuring at least one wave metric of the guided waves at a second location utilizing the FBG. The second location is spaced apart from the first location. The measured wave metric may be compared to an expected or optimal wave metric, and the parameters of the curing process (e.g. time and/or temperature) may be modified during the cure of the part (or during curing of another part if a series of parts are being fabricated) to thereby reduce or eliminate defects in the composite part(s).

These and other features, advantages, and objects of the present invention will be further understood and appreciated by those skilled in the art by reference to the following specification, claims, and appended drawings.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

DETAILED DESCRIPTION

Figure 1:
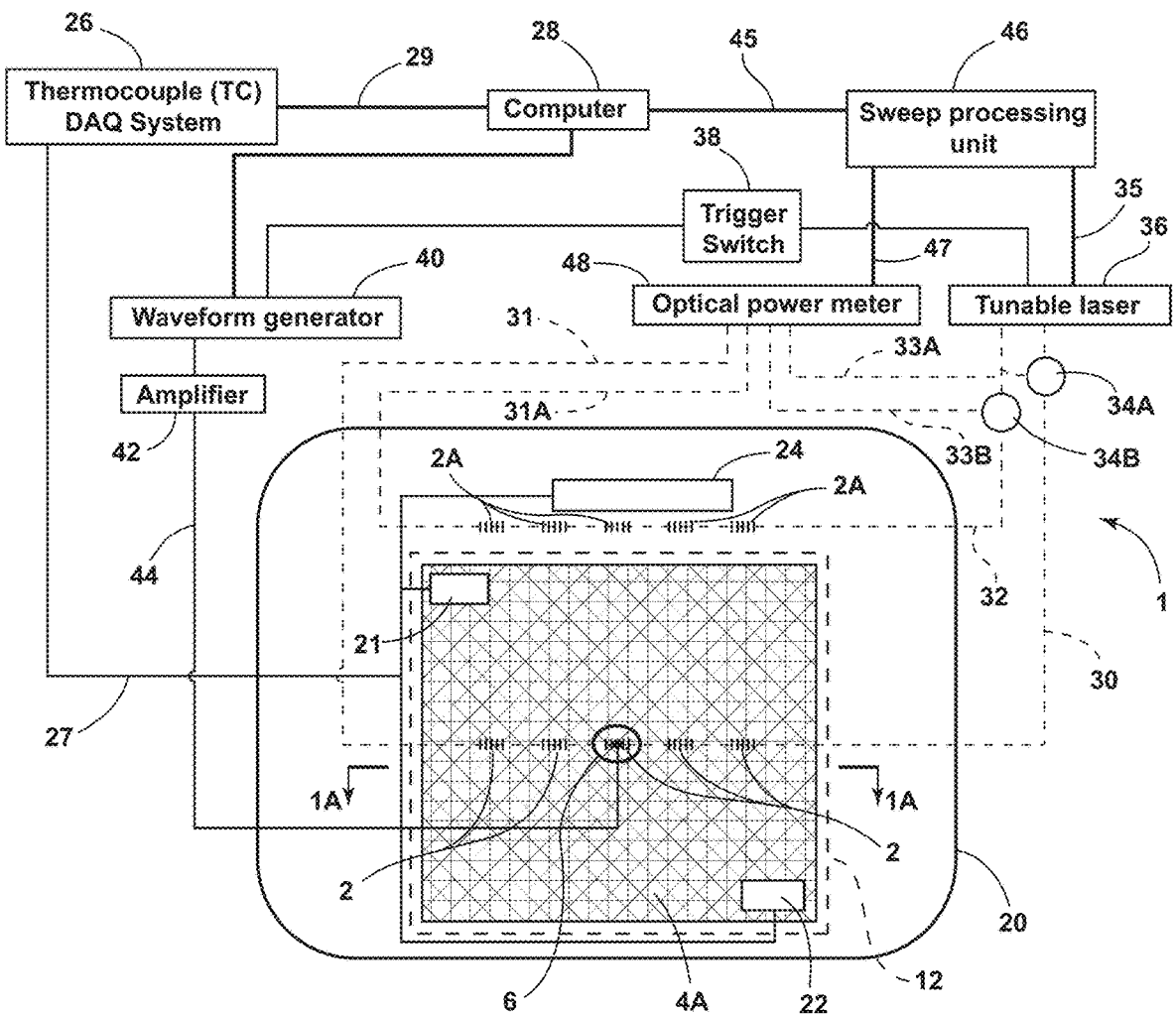
FIG. 1 is a schematic drawing of a guided wave based system for cure monitoring of composites according to one aspect of the present disclosure.
Figure 1A:
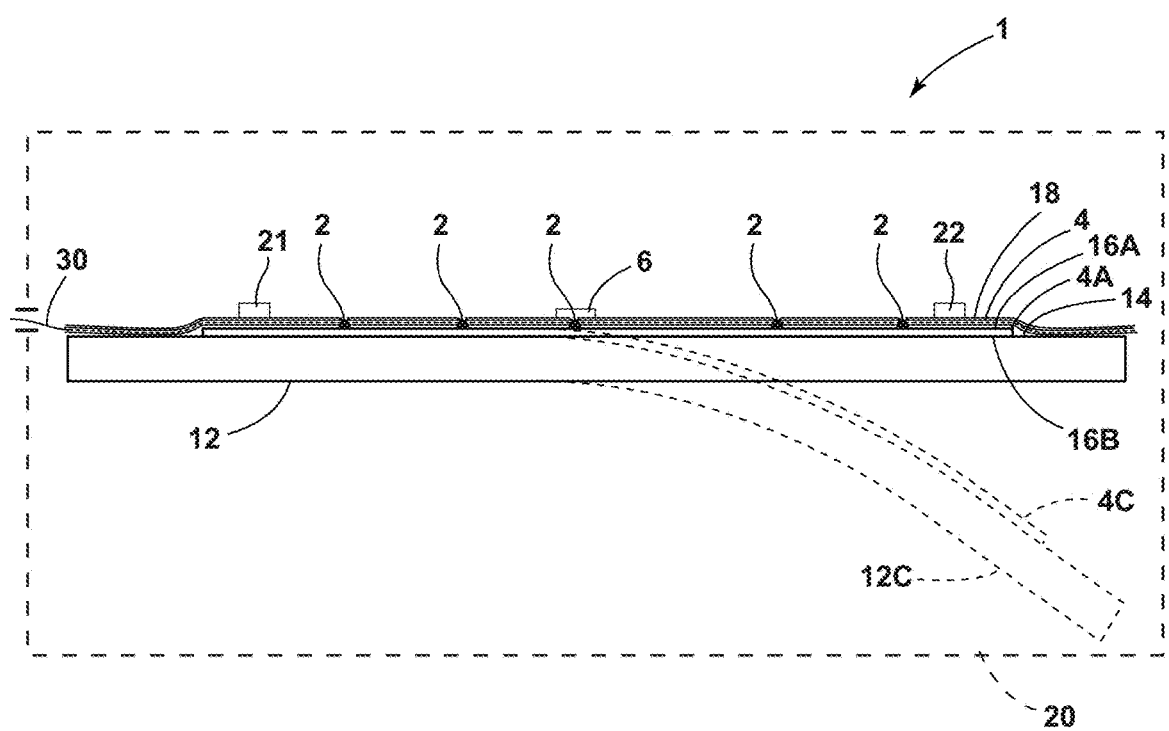
FIG. 1A is cross-sectional view of a portion of the system of FIG. 1 taken along the line 1A-1A.
Figure 2A:
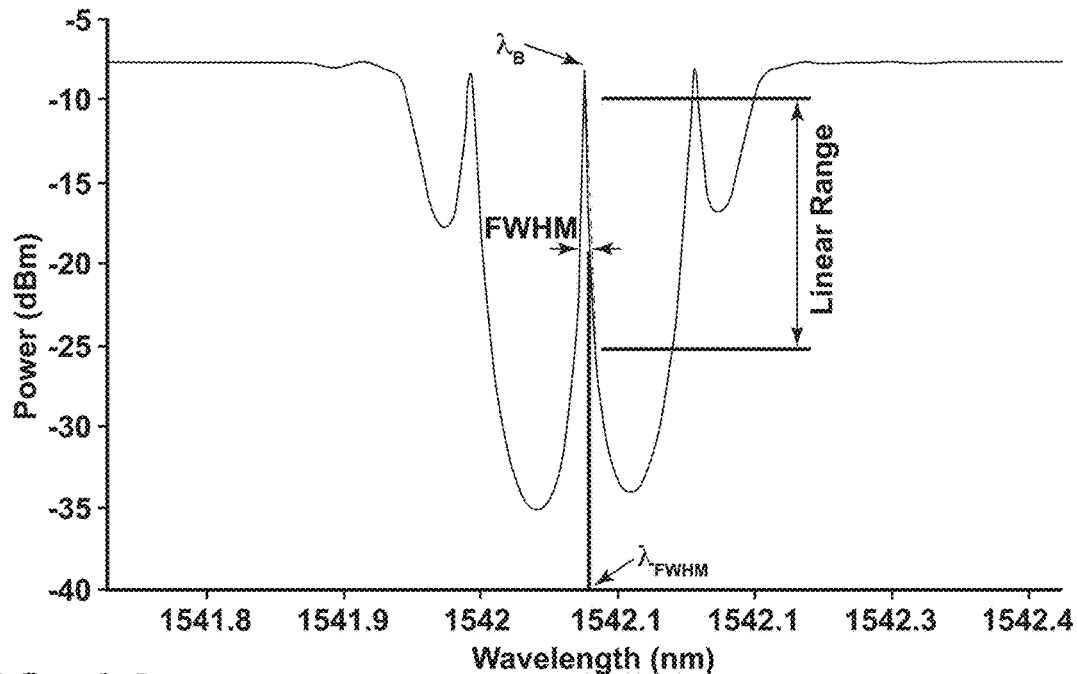
FIG. 2A is a graph showing transmitted spectrum of a PS-FBG.
Figure 2B:
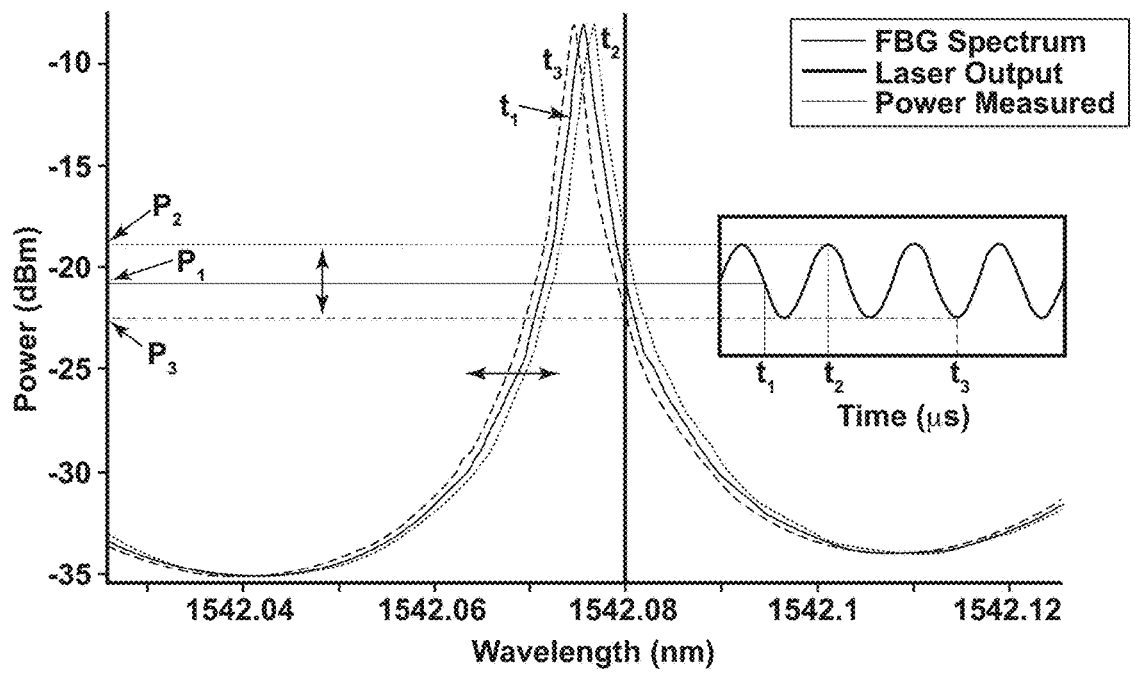
FIG. 2B is a graph showing fluctuation in optical power measured due to shift in wavelength spectrum as the wave propagates past the PS-FBG.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The system and method of the present disclosure utilizes one or more fiber optic sensors [e.g. fiber optic Bragg gratings (FBGs), phase-shifted FBGs (PS-FBGs)] to measure guided wave-based signals for cure monitoring and/or inspection and loads monitoring of components in-service. The guided wave-based system may be in-situ incorporated directly into standard curing equipment and techniques. The system/process may utilize optical fiber sensors in either a single FBG, multiple FBGs, a single PS-FBG, or multiple PS-FBGs arrangement. Because the optical fiber remains embedded in the composite, the sensor(s) can sense wave signals during cure and in-service, enabling life cycle monitoring. Multiple FBG/PS-FBG sensors can be placed along the same optical fiber using wavelength division multiplexing. A fiber optic system, according to the present disclosure may be used in harsh environments, and it may be insusceptible to electric and magnetic fields. The disclosed system may also be utilized for life-cycle monitoring of components. A system according to the present disclosure can also measure strain at the FBG/PS-FBG sensors.

The results of the cure monitoring may be used to adjust the parameters of the curing process (e.g. time and/or temperature) to reduce or eliminate defects in the composite part being cured and/or additional parts produced in a series of parts (e.g. in a production run involving a series of substantially identical parts). Thus, the cure monitoring may be utilized to provide feedback control (e.g. closed loop) during fabrication of composite parts.

With reference to FIG. 1 and FIG. 1A, a system 1 for in-process cure monitoring of the fiber reinforced polymer matrix composite materials includes one or more sensors 2 that may be embedded in a composite part 4. The system 1 also includes a powered actuator 6 that excites waves in the composite part 4. As discussed in more detail below, the waves generated by the powered actuator 6 travel through the composite part 4, and the waves are detected by the sensors 2. In the illustrated example, the powered actuator 6 comprises a piezoelectric disc that is bonded to a surface 4A of the composite part 4. However, it will be understood that the present disclosure is not limited to a piezoelectric actuator and other powered actuators may be utilized in the system 1. The sensors 2 may comprise fiber Bragg gratings such as phase-shifted fiber Bragg gratings (PS-FBG). As used herein, the terms "fiber Bragg grating" and "FBG" refer to virtually any type of optical reflector/transmitter that is configured to reflect/filter light having specific (predefined) wavelengths, including both traditional FBGs and phase-shifted fiber Bragg gratings (PS-FBG). Thus, the terms "fiber Bragg grating" and "FBG" are not limited to a specific sensor or fiber Bragg grating unless specifically stated herein.

Referring again to FIGS. 1 and 1A, the composite part 4 may comprise a plurality of layers of composite pre-preg material that are positioned on a surface 14 of a tool plate 12. The surface 14 may have any shape or contour as required for producing a composite part 4. For example, a curved tool plate 12C may be utilized to form a curved part 4C (FIG. 1A). Sheets of release film 16A and 16B may be positioned on opposite sides of part 4, and a vacuum bag 18 may be positioned over the upper release film sheet 16A. The tool plate 12, composite part 4, and other components may be positioned in an autoclave or oven 20. First and second thermocouples 21 and 22, respectively, may be positioned on upper surface 4A of part 4 as shown in FIG. 1 to measure (monitor) the temperature of the part 4 during the curing process. A reference thermocouple 24 may be positioned in the autoclave 20 to measure/monitor the temperature inside autoclave 20. The thermocouples 21, 22 and 24 are operably connected to a thermocouple digital acquisition (TCDAQ) system 26 via lines 27 (e.g. wires) or other suitable arrangement. The TCDAQ 26 is operably connected to a computer 28 by a data line 29.

Referring again to FIGS. 1 and 1A, sensors 2 may be disposed on (e.g. bonded to) upper surface 4A of a part 4 or the sensors 2 may be embedded in the part 4. Although part 4 may comprise a composite material such as pre-preg composite having fibers disposed in a thermosetting polymer matrix material, it will be understood that part 4 may comprise virtually any material. Also, although the sensor 2 may be referred to herein as being "embedded", it will be understood that the present disclosure is not limited to embedded sensors. The sensors 2 are operably connected to an optical circulator 34A by an optical fiber 30 that may be embedded in composite part 4. A tunable laser 36 receives input from trigger switch 38, which is operably connected to a waveform generator 40. Waveform generator 40 is, in turn, operably connected to computer 28. The waveform generator 40 is operably connected to powered actuator 6 through an amplifier 42 via line 44. System 1 may also include a sweep processing unit 46 that is operably connected to computer 28 via lines 45. The sweep processing unit 46 is, in turn, operably connected to an optical power meter 48 by a line 47. The sweep processing unit 46 is operably connected to tunable laser 36 by a line 35. The optical power meter 48 is connected to first optical circulator 34A and a second optical circulator 34B via optical lines 33A and 33B, respectively. The second optical circulator 34B is operably connected to a reference optical line/fiber 32 and reference sensor 2A. Connections to the optical power meter 48 from sensors 2 and 2A are provided by optical lines/fibers 31 and 31A. It will be understood that the present disclosure is not limited to the arrangement of FIGS. 1 and 1A.

As used herein, the term "guided wave-based" generally refers to a configuration in which waves are transmitted through a material (e.g. composite material). For example, the powered actuator 6 and sensors 2 may be arranged in a pitch-catch configuration in which the powered actuator 6 are spaced apart at a distance. The distance that is preferably at least ten times the thickness of part 4 with an actuator frequency that is preferably between about 60 kHz to about 1 MHz. If part 4 comprises a pre-preg composite, the resin of the composite material of part 4 will transition from the pre-preg through liquid, rubbery and gelled glass to the final composite. Thus, the type of wave propagating throughout the entire cure cycle may not be the classically understood definition of a guided wave.

As discussed in more detail below, the composite part 4 may be interrogated during the entire cure cycle using guided wave-based sensing and strain measurements.

According to one aspect of the present disclosure, a wave may be excited into the composite panel or part 4 using a five-cycle, Hanning windowed, sinusoidal toneburst signal emitted from the waveform generator 40 (e.g. Agilent Technologies: 81150A) to the amplifier 42 (e.g. Krohn-Hite Corporation: Model 7602M) to the powered actuator 6 (e.g. piezoelectric disc). The amplifier 42 may be configured to magnify the input signal to a peak-to-peak voltage of approximately 120 V. The guided wave-based signal was recorded by the sensors 2 (FBGs/PS-FBGs) using optical power meter 48 (e.g. Agilent Technologies: N7744A) and a tunable laser 36 (e.g. Santec: TSL-710). The tunable laser 36 may have a wide wavelength range (e.g. 1480-1640 nm) with wavelength resolution of about 0.1 pm, high wavelength accuracy (e.g. ±2 pm at operating temperature), and a narrow linewidth (e.g. 100 kHz with coherence control off).

System 1 may utilize an automation code written as a combination of MATLAB® and LabVIEW® scripts and functions. Sweep processing unit 46 may be utilized to record the full spectrum of the sensors 2 and 2A (FBG/PS-FBG). The FWHM wavelength ($\lambda_B$) may be identified from the spectrum. The output wavelength of tunable laser 36 may be set to the FWHM wavelength of the sensors 2. The center frequency of the five-cycle, Hanning windowed, sinusoidal toneburst signal may be set using waveform generator 40. During each iteration, the center frequency may be cycled through a predefined number of center frequencies (80, 100, 150, 200, 250, and 300 kHz). The number of frequencies and number of averages per measurement (e.g. five for more) may be set based on the rate at which the spectrum shifts during the temperature ramps of the measurement cycle time.

When waves propagate past the sensors 2 (e.g. FBG/PS-FBG), the local strain at the sensor 2 causes an oscillation of the wavelength spectrum resulting in a fluctuation of the output power measured by optical power meter 48. In the linear range of the sensors 2, the change in optical power that is measured is linearly related to the change in wavelength spectrum, and linearly related to the strain at the sensors 2.

During testing of a system 1 according to the present disclosure, the amplitude, time of arrival (TOA), and group velocity of the guided wave-based measurements and strain in parts 4 comprising CFRP panels (Size: 305 mm×305 mm) during cure in real-time recorded by the FBGs/PS-FBGs was evaluated. The feasibility of using these metrics to identify the key phase transitions during the cure cycle (gelation and vitrification) and material properties (viscosity and degree of cure) was also evaluated. The transformation of resin from the liquid to rubbery state is typically referred to as gelation. The subsequent transformation from the rubbery state to the glassy state may be referred to as vitrification. Time-temperature-transformation (TTT) for existing epoxy resins is generally known. However, the TTT and/or other characteristics the materials of part 4 can be determined empirically if required.

Twelve experiments are discussed below. The test panels 4 were laid up by hand using Hexcel® IM7/8552 unidirectional prepreg (35% resin content, 190 gsm). The test panels 4 were cured in an oven using a two stage cure with a B-stage hold. The temperature was increased to 107° C. at 2.8° C./min, held constant for one hour, increased to 177° C. at 2.8° C./min, held constant for two hours, then cooled down. For some of the tests, a single FBG sensor was embedded into test panels or parts 4. It will be understood, however, that a plurality of FBG sensors may be embedded in a single part 4 to monitor curing at a plurality of locations.

For the first experiment, a flat twenty-four ply unidirectional panel 4, [0]24, was laid up. The panel 4 was 305 mm×305 mm and a PS-FBG 2 was placed in the middle of the composite between plies six and seven in the carbon fiber direction. A piezoelectric actuator 6 was bonded to the top ply 76.2 mm from the PS-FBG in the 0° direction (i.e., wave propagation was in the carbon fiber and optical fiber direction). The second experiment differed from the first by the fact that the part 4 had a quasi-isotropic layup, $[90_2/45_2/0_2/-45_2/90/45/0/-45]_s$, and a PS-FBG sensor 2 was placed between plies nineteen and twenty (0° plies) in the direction of the carbon fiber. Also, a piezoelectric disc 8 was placed 101.6 mm from the PS-FBG sensor 2 in the 0° direction (i.e., wave propagation was in the optical fiber direction). The third experiment was comparable to the first experiment but consisted of an eighteen ply panel (part 4) with PS-FBG 2 embedded between plies fourteen and fifteen in the carbon fiber direction. The piezoelectric actuator 6 (e.g., disc) was bonded the top ply 101.6 mm from the PS-FBG in the 90° direction (i.e., wave propagation was normal to both the carbon fiber and optical fiber direction).

For Experiments 4 and 5, two identical panels (parts 4) were laid up with both composites consisting of twenty-four (305 mm×305 mm) plies where the fiber optic sensor 2 was placed 38.1 mm from the middle of the composite between plies eighteen and nineteen perpendicular to the carbon fiber direction. The piezoelectric actuator 6 was bonded the top ply 38.1 mm from the middle of the composite in the opposite direction of the sensor resulting in a propagation distance of 76.2 mm. The only difference between the fourth and fifth experiments was the sensor used. The fourth experiment used a traditional FBG sensor 2 and the fifth experiment used a PS-FBG sensor 2.

The sixth and seventh experiments involved curved panels (parts 4C). The parts 4 for both experiments consisted of 24 plies (305 mm×305 mm) with a traditional FBG 2 embedded between plies eighteen and nineteen with a propagation distance of 76.2 mm from the piezoelectric actuator 6 to the FBG sensor 2. The FBG sensor 2 was placed 38.1 mm from the middle of the composite (part 4C). The piezoelectric actuator 6 was placed 38.1 mm from the middle of the composite (part 4C) on the top ply in the opposite direction. The only difference between these two experiments was the placement of the sensor 2 relative to the carbon fiber direction; one was perpendicular (Experiment 6) to the carbon fiber while the other was parallel to the carbon fiber (Experiment 7).

For Experiment 8, the panel 4 was flat, consisting of 24 plies (305 mm×305 mm) in a quasi-isotropic layup, $[90_2/45_2/0_2/-45_2/90/45/0/-45]_s$. An optical fiber with five multiplexed FBG sensors 2 with a spacing of 50 mm between each FBG sensor 2 was embedded in the carbon fiber direction between plies five and six. The third sensor 2 placed at the center. The second and fourth sensors 2 were on opposite sides at equal distances of 50 mm, and the first and fifth sensors 2 were on opposite sides at equal distances of 100 mm. All five multiplexed FBGs 2 measured strain but only one sensor (Sensor Four) was utilized for ultrasonic guided wave-based sensing. After the experiment, this panel (part 4) was utilized to develop software for guided wave-based sensing at multiple FBGs 2. The piezoelectric actuator 8 was placed an equal distance from all four edges of the composite, directly in the center, on the top ply.

Experiment 9 had the exact same configuration as Experiment 8 except that all five FBGs 2 performed the guided wave-based measurements and also measured/recorded strain. Experiment 10 was configured in an identical manner to Experiment 9 except it used a linear chirp as the actuation waveform instead of five-cycle, Hanning windowed, sinusoidal toneburst.

Experiment 11 was a curved panel 4C consisting of 24 plies (305 mm×305 mm) configured in a quasi-isotropic layup, $[90_2/45_2/0_2/-45_2/90/45/0/-45]_s$. A single piezoelectric actuator 6 was bonded to the center of the top ply of the composite panel 4C. An optical fiber with five FBG sensors 2 spaced uniformly, with 1 m between each FBG 2, was used in a layered placement scheme. Since the spacing between the FBGs 2 was greater than the size of the composite, excess optical fiber between FBGs 2 was secured to the release film outside of the panel. The five FBGs 2 were placed between 1) plies three and four (both 45°), 2) plies seven and eight (both −45°), 3) plies twelve and thirteen (both −45°), 4) plies seventeen and eighteen (both −45°), and 5) plies twenty-one and twenty-two (both 45°), respectively. The third FBG (between plies twelve and thirteen) was located in the center of the panel 4, directly below the piezoelectric disc 6. The remaining FBGs 2 were located 190.5 mm from the actuator; two near one corner, two near the opposite corner. When the setup was placed under vacuum, the optical fiber fractured at the egress of the composite, limiting measurements to two sensors in the reflected spectrum. Due to the fiber breaking, "Sensor One" refers to the FBG sensor 2 located directly below the piezoelectric actuator 6, and "Sensor Two" refers to an FBG 2 located near the corner of the composite 4 with a propagation distance of 190.5 mm.

Experiment 12 featured a flat, 24-ply (305 mm×305 mm), unidirectional, [90]24, layup. A single piezoelectric disc 6 was bonded in the center of the composite on the top ply. The optical fiber used for Experiment 12 consisted of five FBG sensors 2 spaced uniformly with 50 mm between each FBG 2. The optical fiber was placed perpendicular to the carbon fiber direction, with the center FBG 2 located in the center of the panel 4. The optical fiber was embedded between the nineteenth and twentieth plies.

Experiments 1-3 and 5 utilized single PS-FBGs from QPS Photronics with a nominal center peak ($\lambda_B$) at 1543 nm, a bandwidth of 0.003 nm, a length of 10 mm, and an acrylate coating. Experiments 4, 6, and 7 utilized single FBGs from MicronOptics (Model: os1100) with a nominal AB of 1580 nm, a bandwidth at full width half maximum (FWHM) of 0.25 nm, a length of 10 mm, and a polyimide coating. Experiments 8-10 and 12 utilized five multiplexed FBGs along a single optical fiber from FBGS Technologies (Draw Tower Gratings) with a nominal AB of 1535, 1540, 1545, 1550, and 1555 nm, bandwidth at FWHM of 0.09 nm, length of 10 mm, spacing of 50 mm between gratings, and a Ormocer coating. Experiment 11 utilized two (of the five) multiplexed FBGs along a single optical fiber from MicronOptics (Model: os1200) with a nominal AB of 1556 nm and 1566 nm, a bandwidth at FWHM of 0.25 nm, a length of 10 mm, spacing of 1 m between gratings, and a polyimide coating.

Table 1.0 (below) summarizes the configuration of each experiment, including layup, sensor type, number of sensors, sensor location through-the-thickness, propagation distance, wave propagation direction, and actuation waveform.

generator 40 (e.g. Agilent Technologies: 81150A) to an amplifier 42 (e.g. Krohn-Hite Corporation: Model 7602M) to a piezoelectric disc 6. Piezoelectric discs from Steminc Steiner & Martins (07.0 mm, thickness 0.2 mm, material SM412) were used for Experiments 1-3, from APC International, Ltd. (06.35 mm, thickness 0.254 mm, piezo material 850, curie point 360° C.) were used for Experiments 4-7, and also from APC International, Ltd. (09.52 mm, thickness 1.00 mm, piezo material 850, curie point 360° C.) were used for Experiments 8-12. The amplifier 42 magnified the input signal to a peak-to-peak voltage of approximately 120 V. The guided wave-based signal was recorded by the use of a single FBG, multiplexed FBGs, or PS-FBG operated by an optical power meter 48 (e.g. Agilent Technologies: N7744A) and a tunable laser 36 (e.g. Santec: TSL-710). The Santec TSL-710 tunable laser 36 has a wide wavelength range

TABLE 1.0

Key characteristics of each experiment:

| Experiment # | Layup | Sensor Type | Number of Sensors | Sensor Direction | Sensor Location (through-thickness) | Distance from PZT to FBG/PS-FBG (mm) | Wave Propagation Direction | Actuation Waveform |
|---|---|---|---|---|---|---|---|---|
| 1 | $[0]_{24}$ | PS-FBG | 1 | ∥ to carbon fiber | 18/19** | 76.2 | ∥ to carbon fiber | Toneburst*** |
| 2 | Quasi-isotropic* | PS-FBG | 1 | ∥ to carbon fiber | 19/20 | 101.6 | N/A | Toneburst |
| 3 | $[0]_{18}$ | PS-FBG | 1 | ∥ to carbon fiber | 14/15 | 101.6 | ⊥ to carbon fiber | Toneburst |
| 4 | $[90]_{24}$ | FBG | 1 | ⊥ to carbon fiber | 18/19 | 76.2 | ⊥ to carbon fiber | Toneburst |
| 5 | $[90]_{24}$ | PS-FBG | 1 | ⊥ to carbon fiber | 18/19 | 76.2 | ⊥ to carbon fiber | Toneburst |
| 6 | $[90]_{24}$ (Curved) | FBG | 1 | ⊥ to carbon fiber | 18/19 | 76.2 | ⊥ to carbon fiber | Toneburst |
| 7 | $[0]_{24}$ (Curved) | FBG | 1 | ∥ to carbon fiber | 18/19 | 76.2 | ∥ to carbon fiber | Toneburst |
| 8 | Quasi-isotropic | FBG | 1 (5 for strain) | ∥ to carbon fiber | 5/6 | 50 | N/A | Toneburst |
| 9 | Quasi-isotropic | FBG | 5 | ∥ to carbon fiber | 5/6 | 100, 50, 0, 50, 100 | N/A | Toneburst |
| 10 | Quasi-isotropic | FBG | 5 | ∥ to carbon fiber | 5/6 | 100, 50, 0, 50, 100 | N/A | Chirp**** |
| 11 | Quasi-isotropic (Curved) | FBG | 2 | ∥ to carbon fiber | 3/4, 7/8, 12/13, 17/18, 21/22 | 0, 190.5 | N/A | Chirp |
| 12 | $[90]_{24}$ | FBG | 5 | ⊥ to carbon fiber | 19/20 | 100, 50, 0 50, 100 | ⊥ to carbon fiber | Toneburst |

*$[90_2/45_2/0_2/-45_2/90/45/0/-45]_s$
**Between ply 18/19
***Narrowband, five-cycle, Hanning windowed, sinusoidal toneburst
**Broadband linear chirp The test panels 4 and 4C were interrogated during the entire cure cycle through the use of guided wave-based measurements and strain sensing. A wave was excited into the test panels 4 and 4C** using a five-cycle, Hanning windowed, sinusoidal toneburst (Experiments 1-9,12) or linear chirp (Experiments 10-11) signal emitted from a waveform (1480-1640 nm) with wavelength resolution of 0.1 pm, high wavelength accuracy (±2 pm at operating temperature), and a narrow linewidth (100 kHz with coherence control off).

Fluorinated ethylene propylene (FEP) release film 16 was placed on the top and bottom of the composite panels 4 and 4C. A breather cloth and vacuum bag 18 covered the panels and full vacuum was applied using a vacuum pump (FIG. 1A). A high temperature adhesive (e.g. Loctite EA 9394 QT AERO Part A and Part B) was used to bond the piezoelectric actuator 6 to the face of the composite allowing for proper coupling of the ultrasonic waves into the composite. For a fully embedded system, the piezoelectric actuator 6 may be embedded in the composite. The use of an oven with a port that allowed for the ingress/egress of all wires and optical fibers was utilized to cure the composites. It will be understood that the goal of the testing described herein was not necessarily to produce high quality composite panels, but to rather demonstrate that FBG/PS-FBG re capable of measuring/recording guided wave-based measurements and strain simultaneously (or almost simultaneously) at elevated temperatures during cure, and that meaningful information may be derived from the results. This information may be utilized to modify the curing process during fabrication of composite parts (e.g. during production of composite structures).

For purposes of the experiments described herein, the automation code for the system 1 was written as a combination of MATLAB® and LabVIEW® scripts and functions. The sweep processing unit recorded the full spectrum of the FBG/PS-FBG sensor(s). For every sensor, the FWHM wavelength and $\lambda_B$ were identified from the spectrum. The output wavelength of the tunable laser was set to the FWHM wavelength. The center frequency of the five-cycle, Hanning windowed, sinusoidal toneburst signal was set on the waveform generator. During each iteration, the center frequency was cycled through a predefined number of center frequencies. The number of frequencies and number of averages per measurement (typically five) were set based on the rate at which spectrum shifted and the cycle time. When the wave propagated past the FBG/PS-FBG(s), the local strain at the sensor 2 caused an oscillation of the wavelength spectrum resulting in a fluctuation of the output power measured by the optical power meter 48. In the linear range of the FBGs/PS-FBGs, the change in optical power measured is linearly related the change in wavelength spectrum, which is linearly related to the strain at the sensor 2.

Figure 3:
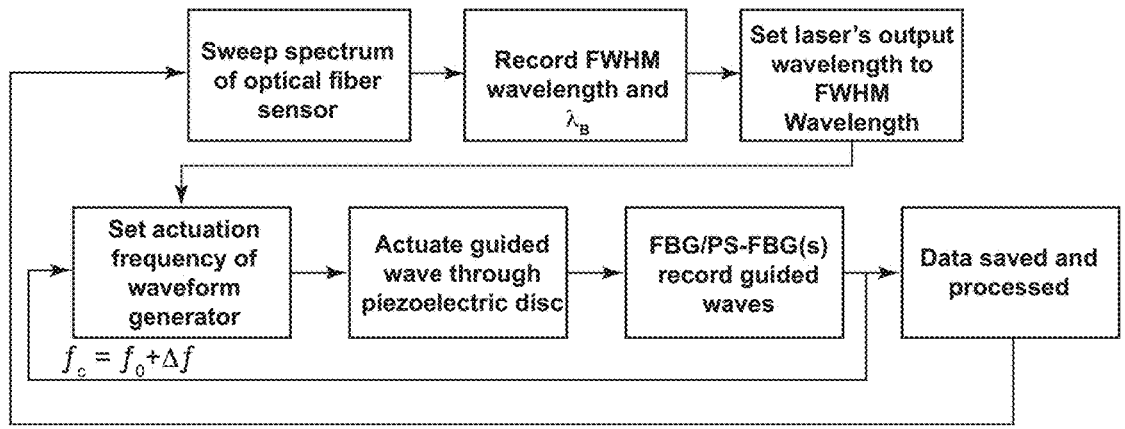
FIG. 3 is a flowchart showing real-time cure monitoring software and algorithm.
Figure 4:
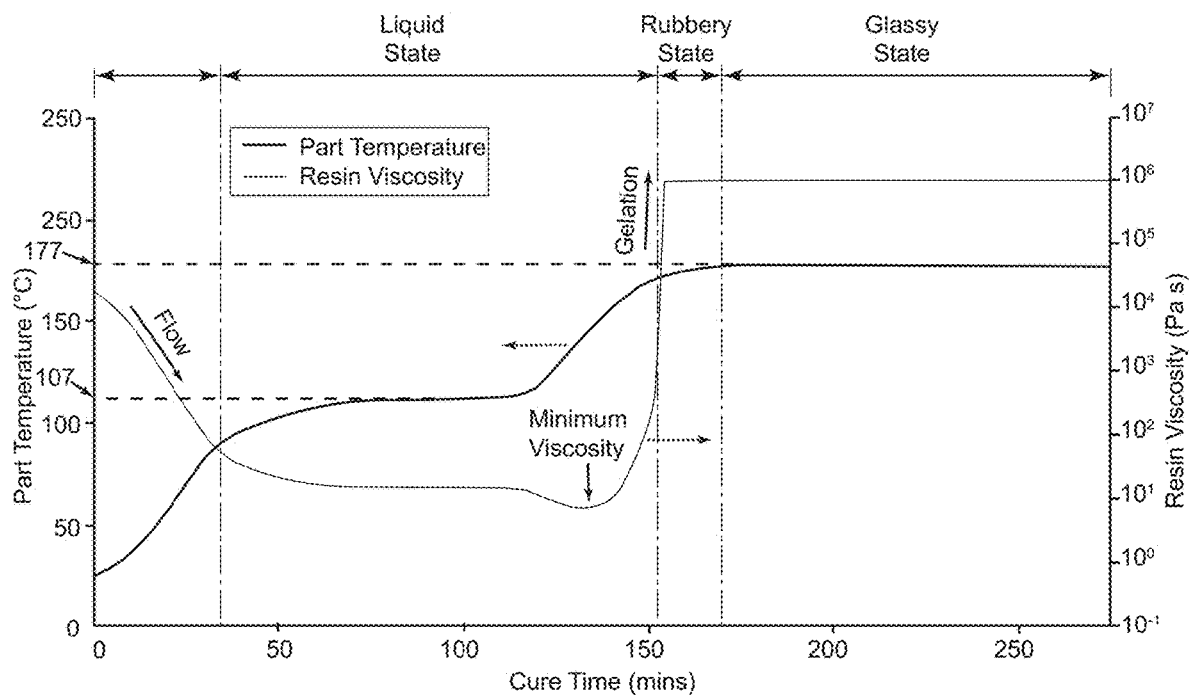
FIG. 4 is a graph showing part temperature (outside left axis) and resin viscosity (outside right axis) as predicted by a known material model using known composite process simulation software (Experiment 10)
Figure 5:
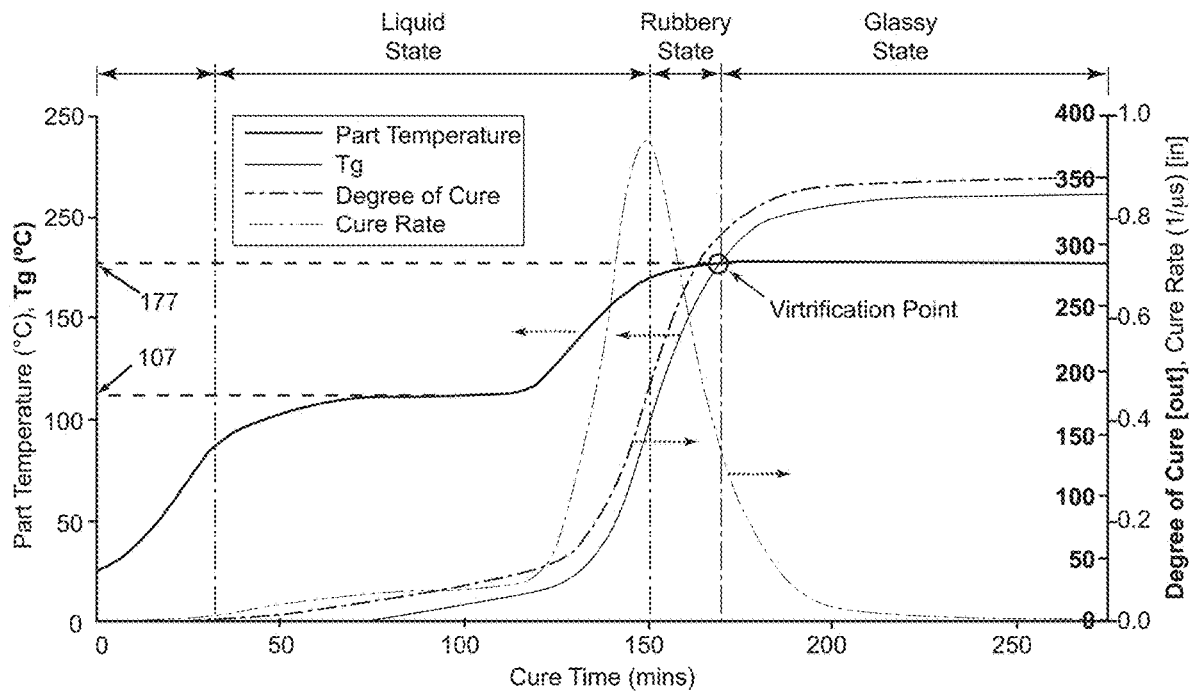
FIG. 5 is a graph showing part temperature (outside left axis), $T_g$ (outside left axis), degree of cure (outside right axis), and cure rate (inside right axis) as predicted by a known material model using a known composite process simulation software (Experiment 10)
Figure 6:
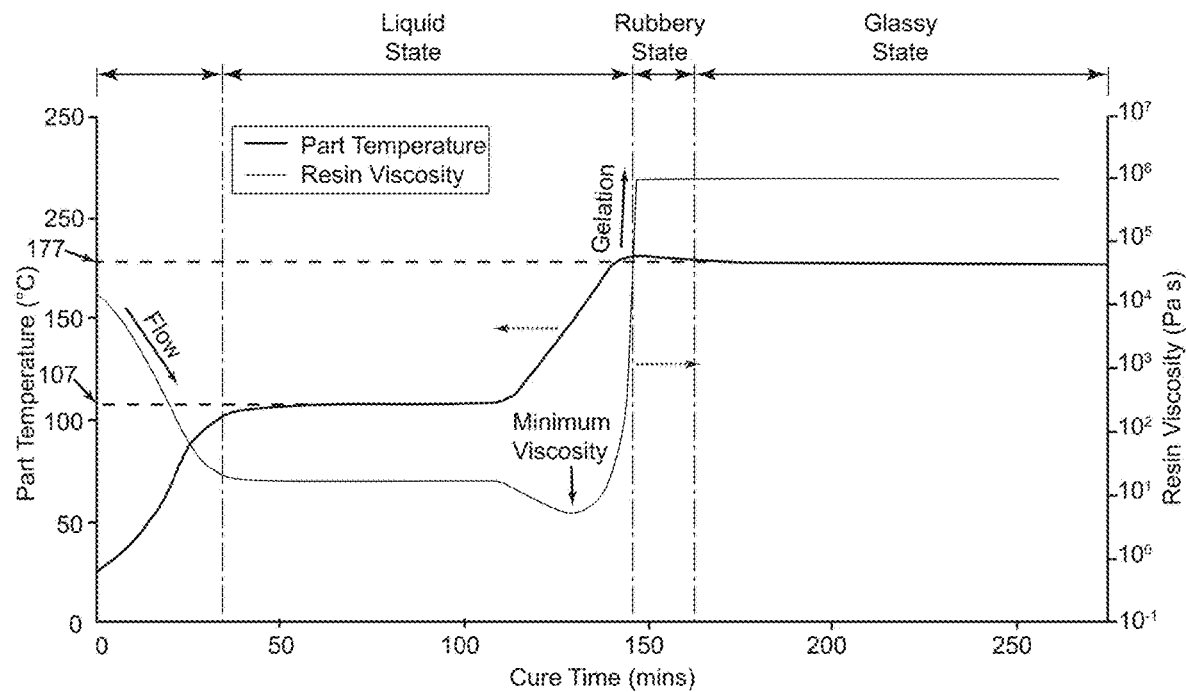
FIG. 6 is a graph showing part temperature (outside left axis) and resin viscosity (outside right axis) as predicted by a known material model using a known composite process simulation software (Experiment 11) on a curved part.
Figure 7:
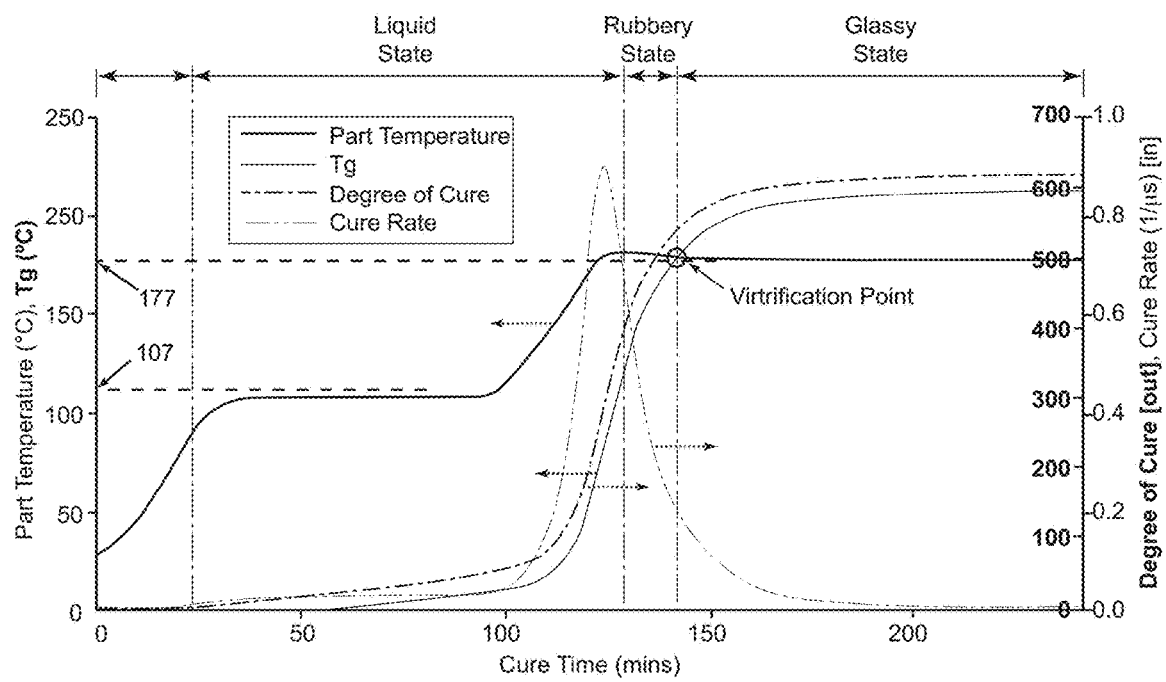
FIG. 7 is a graph showing part temperature (outside left axis), $T_g$ (outside left axis), degree of cure (outside right axis), and cure rate (inside right axis) as predicted by a known material model using a known composite process simulation software (Experiment 11) on a curved part.

After recording all of the necessary data from the cure cycle, the data was processed through a bandpass filter and analyzed using MATLAB®. Through the use of MATLAB®, it was possible to constantly monitor $\lambda_B$ and the FWHM wavelength of the FBGs/PS-FBGs, ensuring the proper peak and slope was chosen throughout the cure. FIG. 3 is a flowchart showing the real-time cure monitoring software procedure and algorithm for the experiments.

For Experiments 9, 10, and 12, five FBG sensors 2 were used (two FBGs for Experiment 11) in a multiplexed arrangement within a single optical fiber. The sweep processing unit 46 recorded the full spectrum of all five sensors 2 in one sweep. From the spectrum, the FWHM wavelength and $\lambda_B$ were calculated for each individual FBG sensor 2. The experimental setup was the same except for the usage of multiplexed FBG sensors 2.

Beginning with Experiment 8, the implementation of increased hardware and software automation resulted in more efficient and expedited data collection. An automated switch was incorporated to mechanically change the trigger input to the optical power meter from the tunable laser for strain measurements (sweeping operation) to the waveform generator for guided wave-based measurements and back without human interaction. In addition, a more robust algorithm was developed to determine the Bragg wavelength and the FWHM wavelength, such that the operator was no longer required to manually confirm the result after each wavelength sweep. This also allowed the output of more center frequencies in Experiment 8 in comparison to Experiments 1-7 when using only a single sensor 2. In the case of Experiments 9 and 12, the improved data collection allowed five center frequencies to still be actuated from the waveform generator for each of the five sensors with five wave measurements (i.e., averages) per sensor.

In addition to the narrowband, five-cycle, Hanning windowed, sinusoidal toneburst waveform, a broadband linear chirp waveform was used during testing. A chirp waveform sweeps through a range of frequencies in a short period of time and is defined by Eq. (1.1).

$$S_c(t) = Aw(t)[H(t) - H(t-T)]\sin\left(2\pi f_0 t + \frac{\pi B t^2}{T}\right) \quad (1.1)$$

where $S_c(t)$ is the chirp waveform, A is the peak amplitude, w(t) is a Tukey window (12.5% part of cosine), H(t) is the Heaviside function, $f_0$ is the minimum frequency (5 kHz), t is time, B is bandwidth (455 kHz) (maximum frequency equal minimum frequency plus bandwidth), and T is chirp duration (200 µs).

Rather than being run at several distinct center frequencies (as with the toneburst waveform), the waveform generator 40 was, during testing, set to excite a chirp waveform through the piezoelectric actuator 6 with discretization of the data into specific frequencies during post-processing. This discretization was performed with a continuous wavelet transformation using a Gabor wavelet in MATLAB®. This transformation affords access to data for chosen frequencies through a time-frequency analysis.

To increase the signal-to-noise ratio, the number of averages per measurement was increased to twenty-five. The increased number of averages was possible because of the reduced cycle time resulting from not iterating through center frequencies as with the toneburst actuation waveform.

Using the same embedded FBG/PS-FBG sensor(s) 2, strain was recorded simultaneously or almost simultaneously with the guided wave-based signals. For temperature compensation, one or more reference optical fiber sensors 2A (FIG. 1) were placed outside of the vacuum bag 18 during the cure process. The respective $\lambda_B$ values of the embedded sensor(s) 2 and the reference sensor(s) 2A were compared to each other to calculate the strain being experienced throughout the cure cycle. First and second thermocouples 21, 22 underneath (inside) vacuum bag 18 measured the temperature of the part 4, and a reference thermocouple 24 placed outside of the vacuum bag 18 measured the temperature of the external (reference) optical fiber 32. The two thermocouples 21, 22 used to measure the part temperature were directly attached on top surface 4A of the composite part 4, 4C with the use of Kapton tape to remediate the issue of a thermocouple 24 becoming embedded in the composite during cure. The placement of the third thermocouple was adjacent to the reference FBG/PS-FBG sensors 2A outside the vacuum bag 18.

For testing purposes, the reference FBG/PS-FBG(s) 2A were assumed to be strain free ($\varepsilon_{ref}=0$) throughout the cure. The strain in the embedded sensor(s) 2 was calculated by Eq. (1.4).

$$\frac{\Delta \lambda_{B,sen}}{\lambda_{B,sen}} = C_\varepsilon \varepsilon_{sen} + C_T \Delta T = C_\varepsilon \varepsilon_{sen} + C_T(T_{sen} - T_0) \quad (1.2)$$

-continued $$\frac{\Delta\lambda_{B,ref}}{\lambda_{B,ref}} = C_\varepsilon \varepsilon_{ref} + C_T \Delta T = C_T(T_{ref} - T_0) \quad (1.3)$$

Solving for $\varepsilon_{sen}$, $$\varepsilon_{sen} = \frac{\frac{\Delta\lambda_{B,sen}}{\lambda_{B,sen}} - \frac{\Delta\lambda_{B,ref}}{\lambda_{B,ref}} - C_T(T_{sen} - T_{ref})}{C_\varepsilon} \quad (1.4)$$

where $\lambda_{B,sen}$ were the values recorded from the PS-FBG 2, the single traditional FBG 2, or each of the multiplexed traditional FBGs 2 embedded in the composite and $\lambda_{B,ref}$ were the values of the sensor(s) 2A outside of vacuum bag 18. $\Delta\lambda_B$ is the change in $\lambda_B$ during the experiment.

$$\Delta\lambda_B = \lambda_B - \lambda_{B_0} \quad (1.5)$$

$T_{sen}$ was the temperature of the embedded optical fiber 30 measured by the use of two thermocouples 21, 22 (averaged) that were attached to the composite 4 during the cure cycle, and $T_{ref}$ was the temperature of the reference optical fiber 32 which was measured by the use of a thermocouple 24 outside the vacuum bag 18 alongside the reference optical fiber 32. $T_0$ was the temperature of the fiber optic sensors 2 before the initiation of the cure cycle (i.e. room temperature). $C_\varepsilon$ is the strain coefficient (0.76) for the FBG/PS-FBG(s) 2, and $C_T$ is the coefficient of temperature for the optical fiber sensors. $C_T$ was determined through a series of calibration tests using strain-free FBG/PS-FBG sensors 2.

In addition to the testing, zero-dimensional (material only) simulations of the cure response were performed using RAVEN® composite process simulation software. The material model utilized in RAVEN® was a known semi-empirical material model that is based on lab-scale tests (e.g., DSC and rheology). RAVEN® simulations were conducted for all of the testing described herein. However, since the simulations are very similar, with the exception of the curved structures, the simulations for Experiment 10 (representative of flat panels) and Experiment 11 (representative of curved structures) are shown in FIGS. 4-7. In the drawings, the shaded regions correspond to the predicted state of the resin in the composite at that point of the cure cycle.

For testing purposes, zero-dimension simulation was determined to be sufficient to model the cure kinetics in each situation. This was demonstrated by comparing the cure kinetic results to one-dimensional, "drill-through" simulations where only negligible differences were observed.

Figure 8:
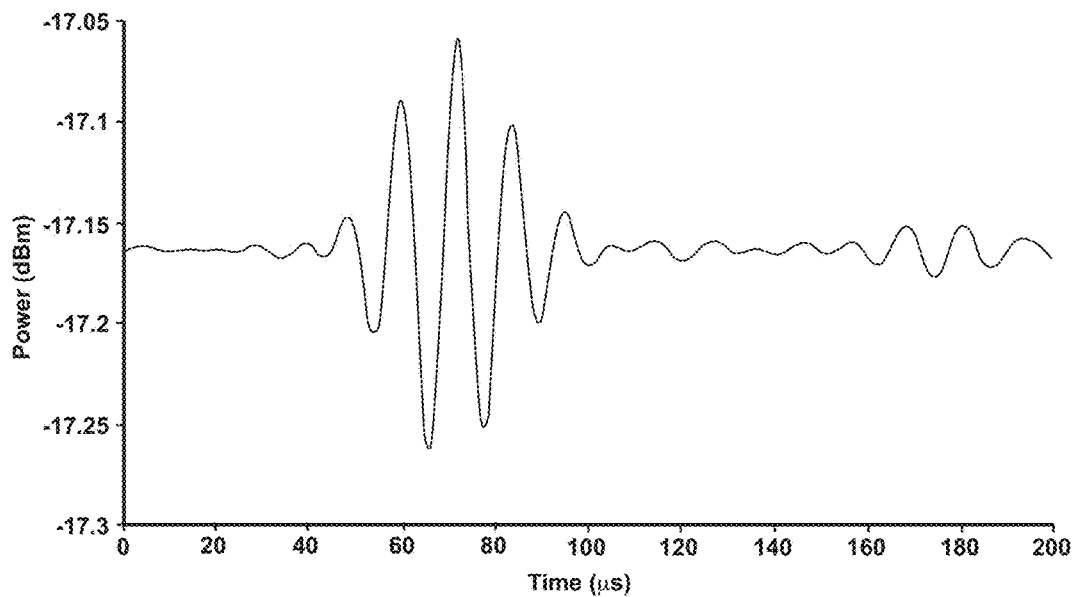
FIG. 8 is a graph showing plate response for five-cycle, Hanning windowed, sinusoidal toneburst actuation at a center frequency of 80 kHz and cure time of 280 minutes (Experiment 5)

A narrowband, five-cycle, Hanning windowed, sinusoidal toneburst waveform was utilized in Experiments 1-9 and 12. The plate response for five-cycle Hanning windowed, sinusoidal toneburst actuation at a frequency of 80 kHz and cure time of 280 minutes for Experiment 5 is shown in FIG. 8. (Note: For purposes of describing the tests herein, the terms "cure time" and "oven time" are generally interchangeable because the composites were cured in an oven. However, it will be understood that these terms are not generally interchangeable.)

By assembling data for each individual waveform at a particular actuation center frequency for the toneburst waveform, the full time-history of the composite response can be viewed as a three-dimensional surface and contour plot. This can be seen for the guided wave-based signals of the 150 kHz actuation throughout the cure process up to cool down in FIG. 9 (Experiment 1). Each guided wave-based measurement (e.g., FIG. 8) is one "slice" of the full time-history (e.g., FIG. 9).

Figure 9:
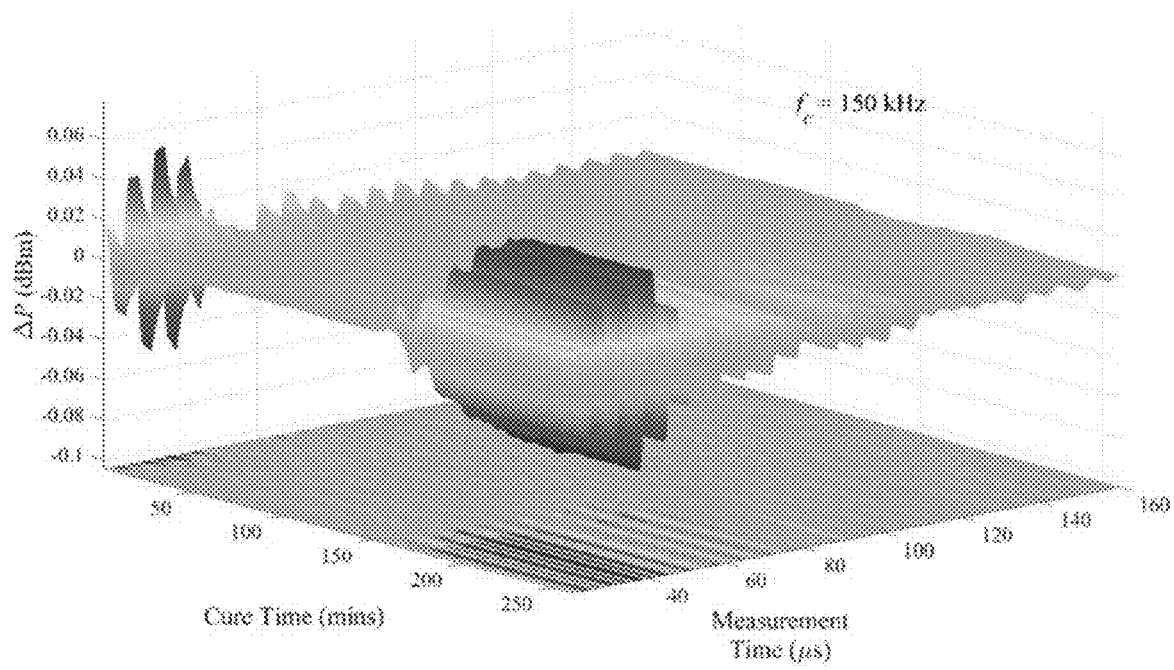
FIG. 9 is a graph showing 3-D surface and contour plot of recorded signals for 150 kHz center frequency actuation throughout the cure process up to cool down (Experiment 1)
Figure 10:
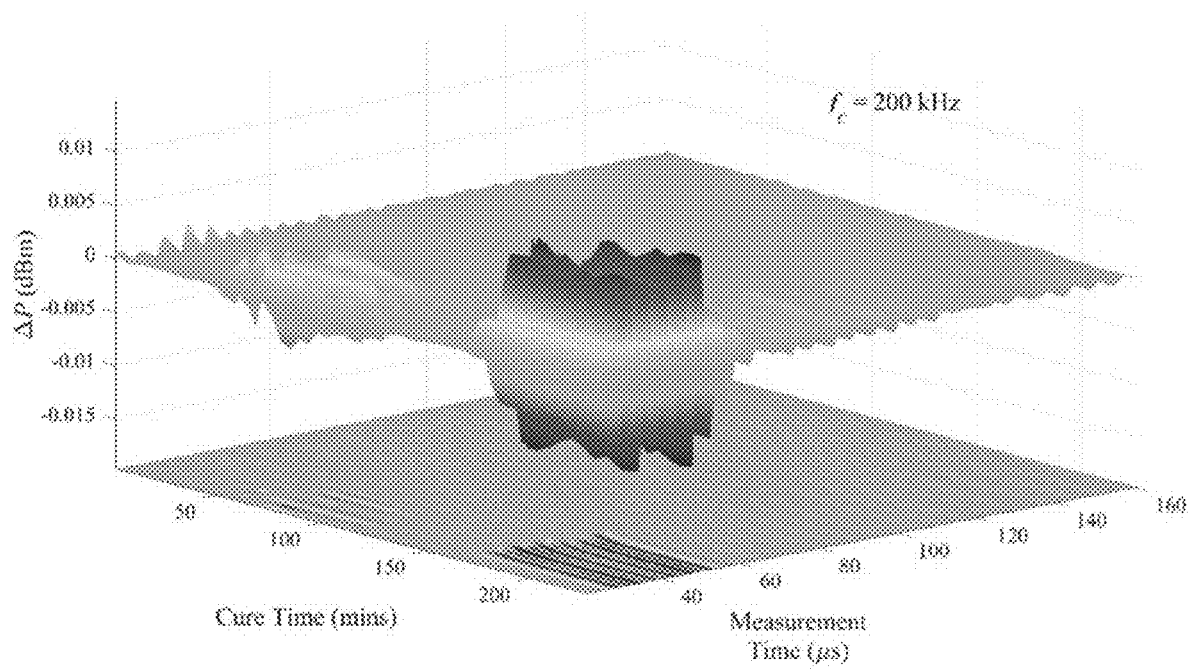
FIG. 10 is a graph showing 3-D surface and contour plot of recorded signals for 200 kHz center frequency actuation throughout the cure of a quasi-isotropic composite panel up to cool down (Experiment 2)

FIG. 10, similar to FIG. 9, shows the full time-history of the composite response of the five-cycle, Hanning windowed, sinusoidal toneburst actuation with a center frequency of 200 kHz actuation throughout the cure of a quasi-isotropic composite panel 4 up to cool down (Experiment 2).

From the three-dimensional surface and contour plots of guided wave-based signals, it can be seen that the onset of vitrification was marked by the cure time at which there was a significant increase in peak change in power (i.e., amplitude) of the waves. In the tests, this occurred early in the second temperature hold (177° C.) usually at a cure time of about 160 to about 180 minutes.

Figure 11:
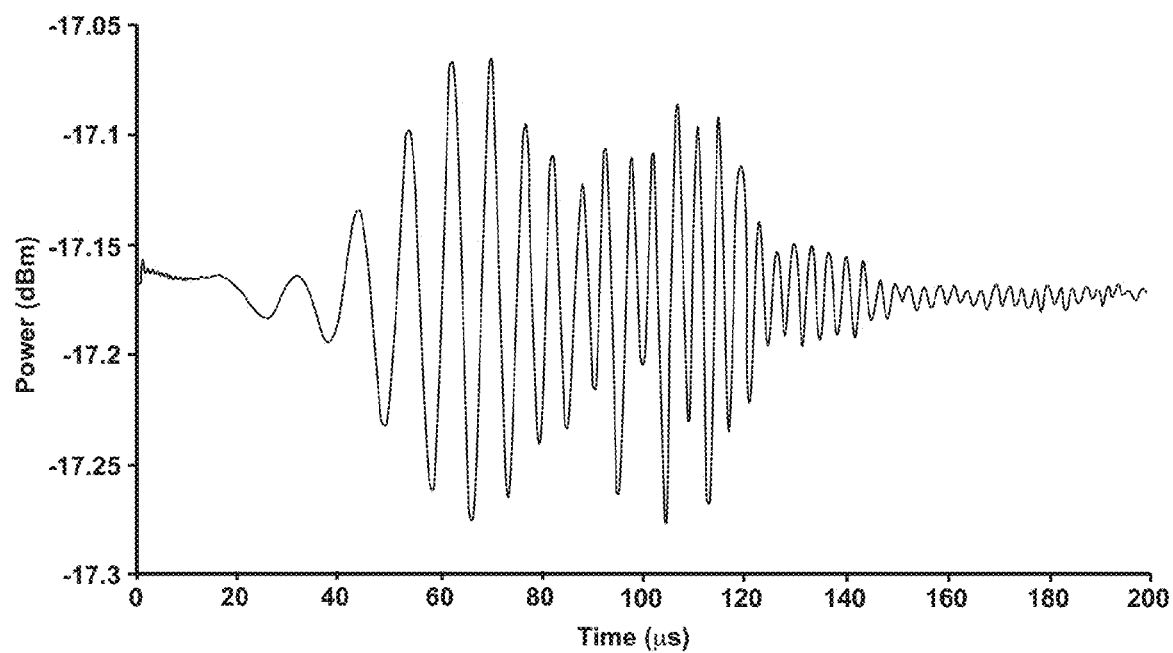
FIG. 11 is a graph showing panel response at Sensor Three for 5-460 kHz linear chirp waveform actuation at a cure time of 156 minutes (Experiment 10)

For the chirp waveform, similar plots can be constructed for each sensor 2 based on guided wave-based signals recorded throughout the cure process. FIG. 11 shows the panel response for the chirp waveform at a cure time of 159 minutes. In contrast to comparable plots for the toneburst waveform (e.g., FIG. 8), FIG. 11 displays the response for a sweep of frequencies rather than for a single center frequency.

Figure 12:
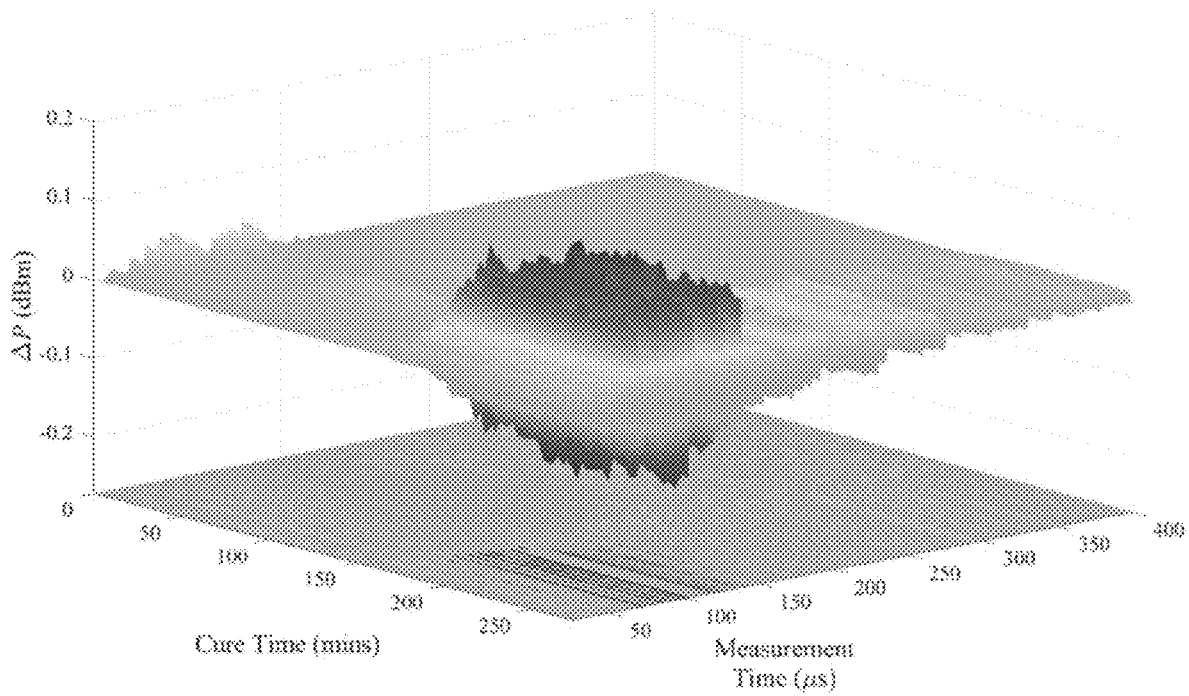
FIG. 12 is a graph showing 3-D surface and contour plot of recorded signals at Sensor Two (150.5 mm propagation distance) for 5-460 kHz linear chirp waveform during the cure cycle (Experiment 10)

FIG. 12 shows the plate response measured at the second FBG sensor 2 from the start of cure until cool down for the chirp actuation waveform in Experiment 10. Similar to the three-dimensional plots based on experimentation using the toneburst waveform, FIG. 12 begins to show high amplitude data for change in power around the time of vitrification (160-180 minutes).

The peak change in power, $\Delta P_{peak}$, from the measurements was determined by the maximum of the recorded signals.

$$\Delta P_{peak}(CT_i, x_j, f_{c_k}) = \max_i[\Delta P(CT_i, x_j, f_{c_k}, t_l)] \quad (1.6)$$

where $\Delta P$ is the change in power measured by the optical power meter at measurement time, $t_l$, and $CT_i$, $x_j$, and $f_{c_k}$ denote the discrete cure time, location (i.e., sensor), and center frequency of actuation at which the measurement was taken, respectively.

The peak change in power was then normalized by dividing the change in power value from every measurement by the maximum power observed during the entire cure cycle by the sensor and actuation center frequency [Eq. (1.7)]. This normalized each peak change in power value to a number between zero and one.

$$\Delta P_{norm,peak}(CT_i, x_j, f_{c_k}) = \frac{\Delta P_{peak}(CT_i, x_j, f_{c_k})}{\max_i[\Delta P_{peak}(CT_i, x_j, f_{c_k})]} \quad (1.7)$$

Because the system loops through the sensors and actuation center frequencies, measurements at different sensors and actuation center frequencies occur at slightly different cure times (typical cycle times were two minutes for entire loop). Thus, the average normalized peak change in power was first interpolated at defined cure times before averaging across sensor and center actuation frequency.

$$\Delta P_{avg,norm,peak}(CT) = \frac{1}{np}\sum_{k=1}^{p}\sum_{j=1}^{n}\Delta P_{norm,peak}(CT, x_j, f_{c_k}) \quad (1.8)$$

The average normalized peak change in power, $\Delta P_{avg,norm,peak}$, are the averaged results from every sensor and actuation frequency throughout the entire cure cycle. This was done to remove sensor and frequency variation in the results, allowing for cleaner interpretation and communication of the effect of curing on the amplitude of the guided wave-based signals.

Figure 13:
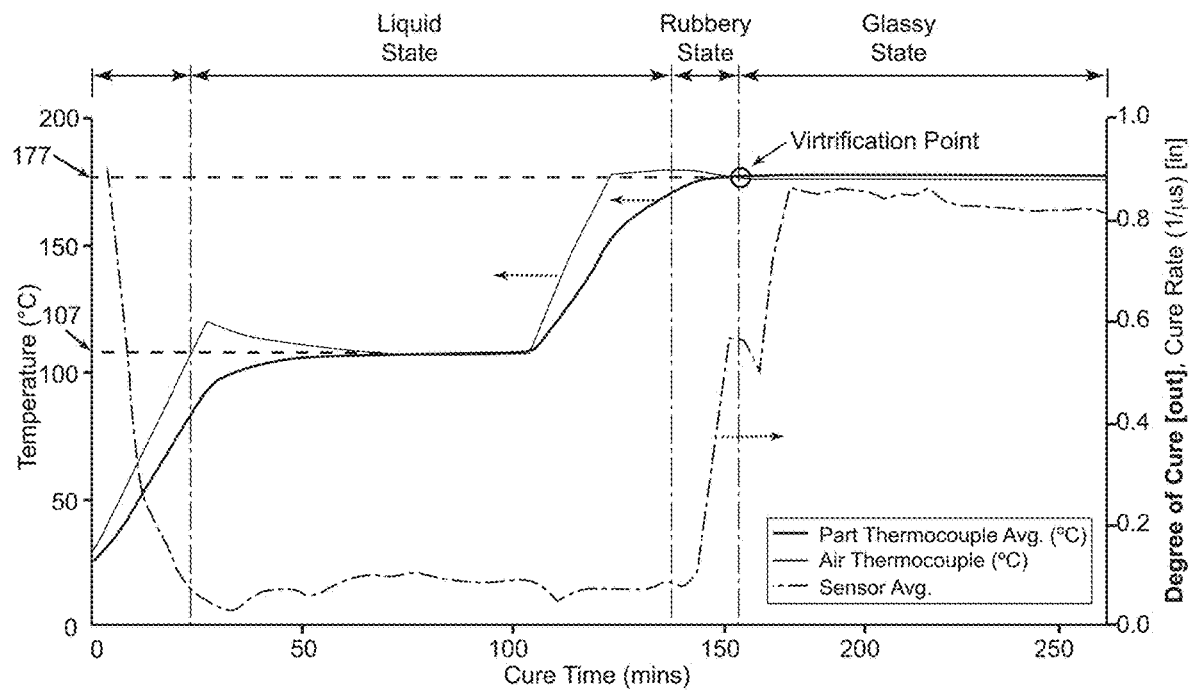
FIG. 13 is a graph showing average normalized peak change in power from six excitation center frequencies (80, 100, 150, 200, 250, and 300 kHz) (Experiment 1)
Figure 14:
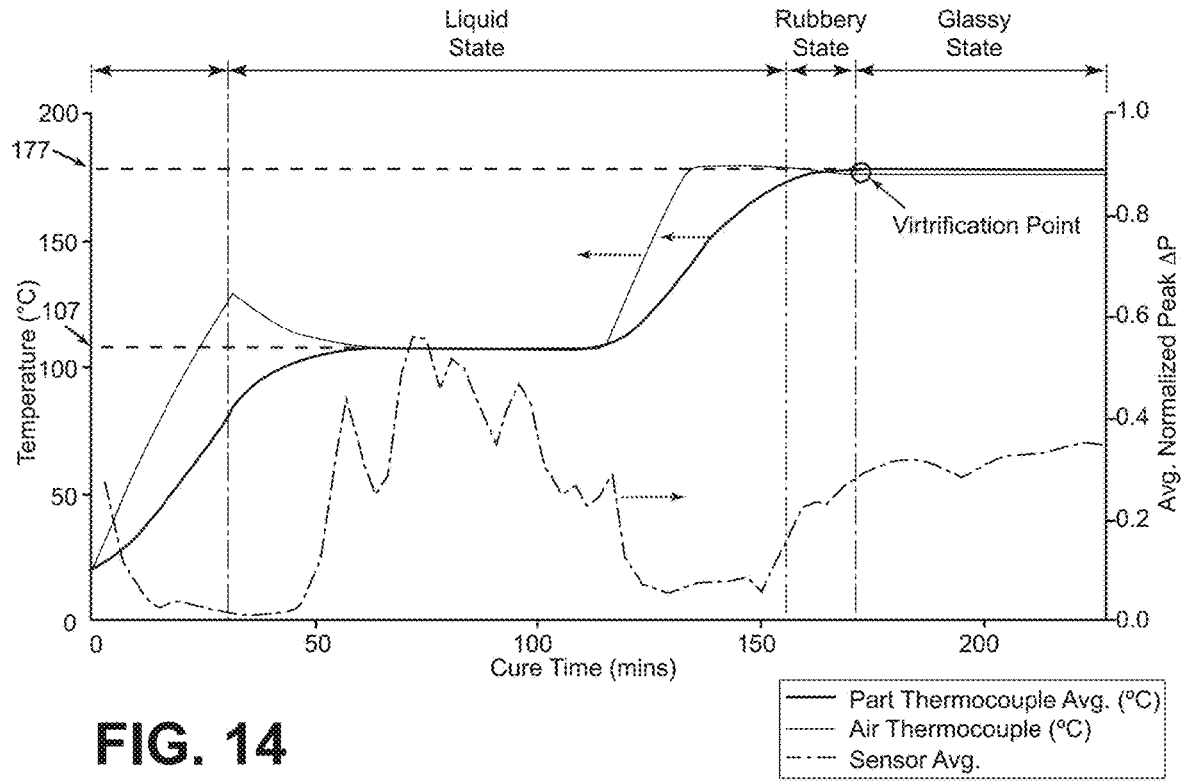
FIG. 14 is a graph showing average normalized peak change in power from six excitation center frequencies (80, 100, 150, 200, 250, and 300 kHz) (Experiment 2)

The average normalized peak change in power for Experiments 1 and 2 are shown in FIGS. 13 and 14, respectively.

The average normalized peak change in power has a similar trend among experiments with a unidirectional layup, and a slightly different trend among the experiments with a quasi-isotropic layup. During all experiments, the average normalized peak change in power spiked during the transition to the glassy state (vitrification). This may have occurred because the wave experiences less damping during the glassy state as compared to the rubbery state. The rubbery state has increased damping, thus more energy is dissipated from the mechanical wave as it travels from the actuator to the sensor. The data from Experiment 12 suggested the panel vitrified later than the predicted time from simulation. The group velocity results, discussed later, indicated a similar conclusion.

For most experiments, there was also a distinguishable increase in average normalized peak change in power at gelation (transition from liquid to rubbery state). This may have been caused by greater strain transfer, as the wave passes by the sensor, from the composite to the FBG/PS-FBG. Only when the layup was quasi-isotropic (Experiment 2, Experiment 8, and Experiment 9) was the amplitude of the waves visibly significant in the liquid state (compared to the glassy state). Again, this may be due to strain transfer from the composite to the FBG/PS-FBG when the resin was liquid. The fiber bed may have assisted in the strain transfer when the layup was quasi-isotropic.

Figure 16:
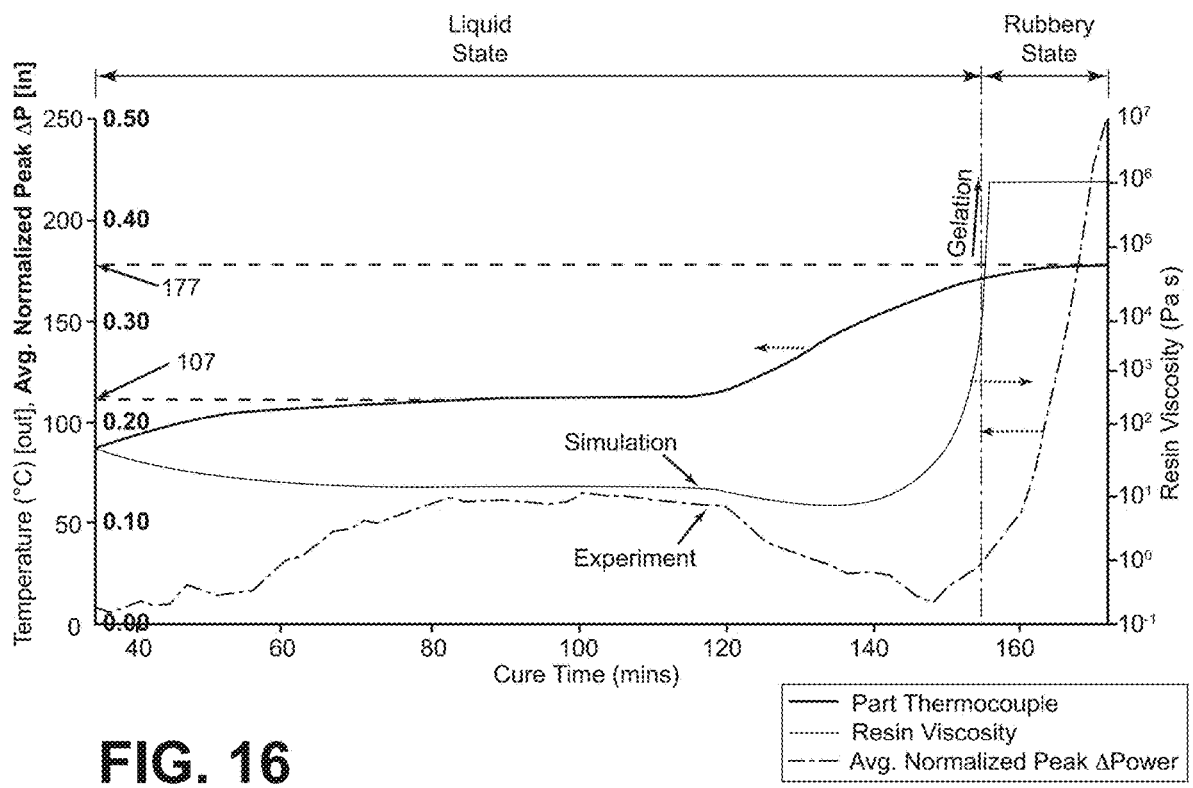
FIG. 16 is a graph showing part temperature (outside left axis), average normalized peak change in power (inside left axis), and resin viscosity (outside right axis) shown during stages of cure in which the resin was in the liquid and rubbery states (Experiment 10)

FIG. 16 represents the average peak change in power for Experiment 10.

Figure 15:
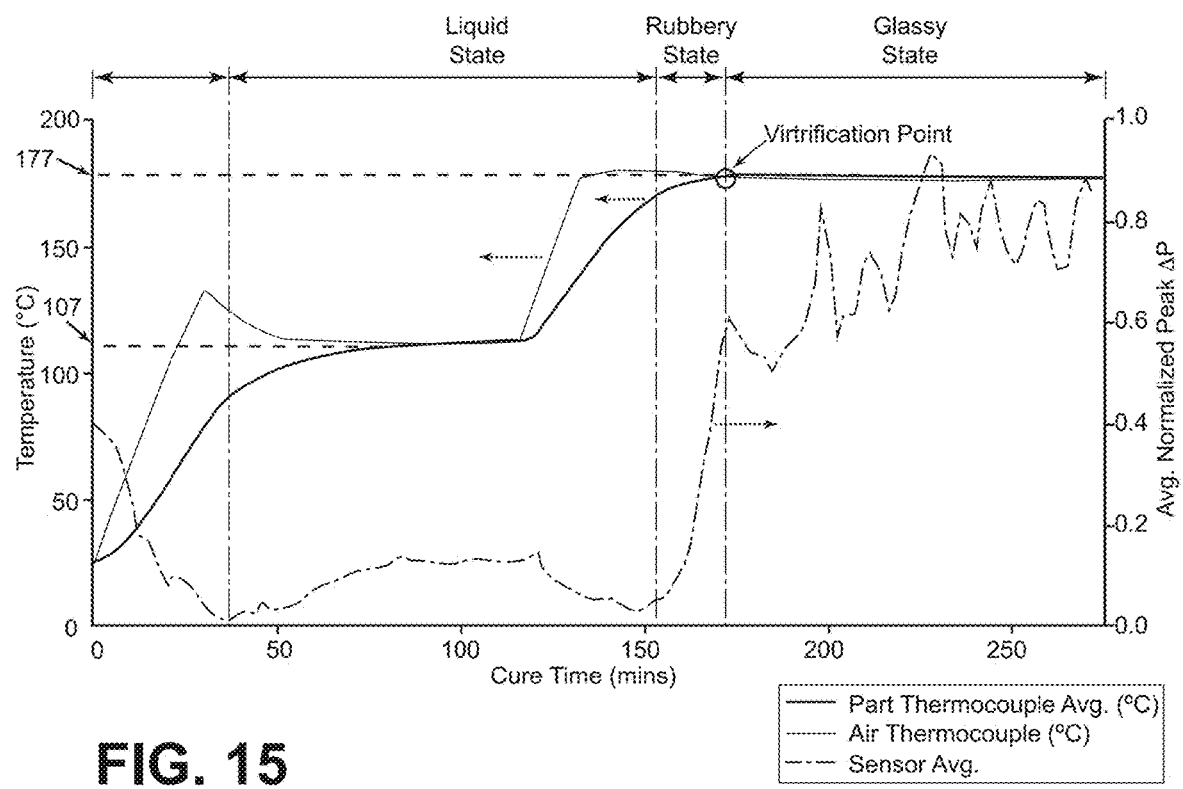
FIG. 15 is a graph showing average normalized peak change in power from five sensors for a 5-460 kHz linear chirp waveform (Experiment 10)

As was seen in testing using the toneburst waveform (e.g. FIGS. 13 and 14), the average normalized peak change in power reached its maximum value while in the glassy state for Experiments 10 (FIG. 15). FIG. 15 shows a distinct increase in peak change in power as the panel transitioned through the rubbery state. Data for this experiment follows the general trend expected for quasi-isotropic layups based on previous testing.

The average normalized peak change in power decreased during the second temperature ramp (to 177° C.) as the viscosity approached its minimum (e.g., FIG. 16). This was true during testing using both the chirp (Experiment 10 and 11) and toneburst (Experiments 2 and 9, but not for Experiment 8) actuation waveform when the layup was quasi-isotropic. Again, this may be explained by strain transfer from the composite to the FBG/PS-FBG as the wave passes the sensor; a lower viscosity results in lower strain transfer.

The TOA was identified by finding the measurement time at which $\Delta P_{peak}$ occurred. The TOA was then averaged across center actuation frequency at the defined cure times [Eq. (1.9)]. As with peak change in power, the TOA values were interpolated at defined cure times before averaging since measurements at each sensor and actuation center frequency occur at slightly different cure times.

$$TOA_{avg}(CT) = \frac{1}{np}\sum_{k=1}^{p}\sum_{j=1}^{n} TOA(CT, x_j, f_{c_k}) \qquad (1.9)$$

Figure 17:
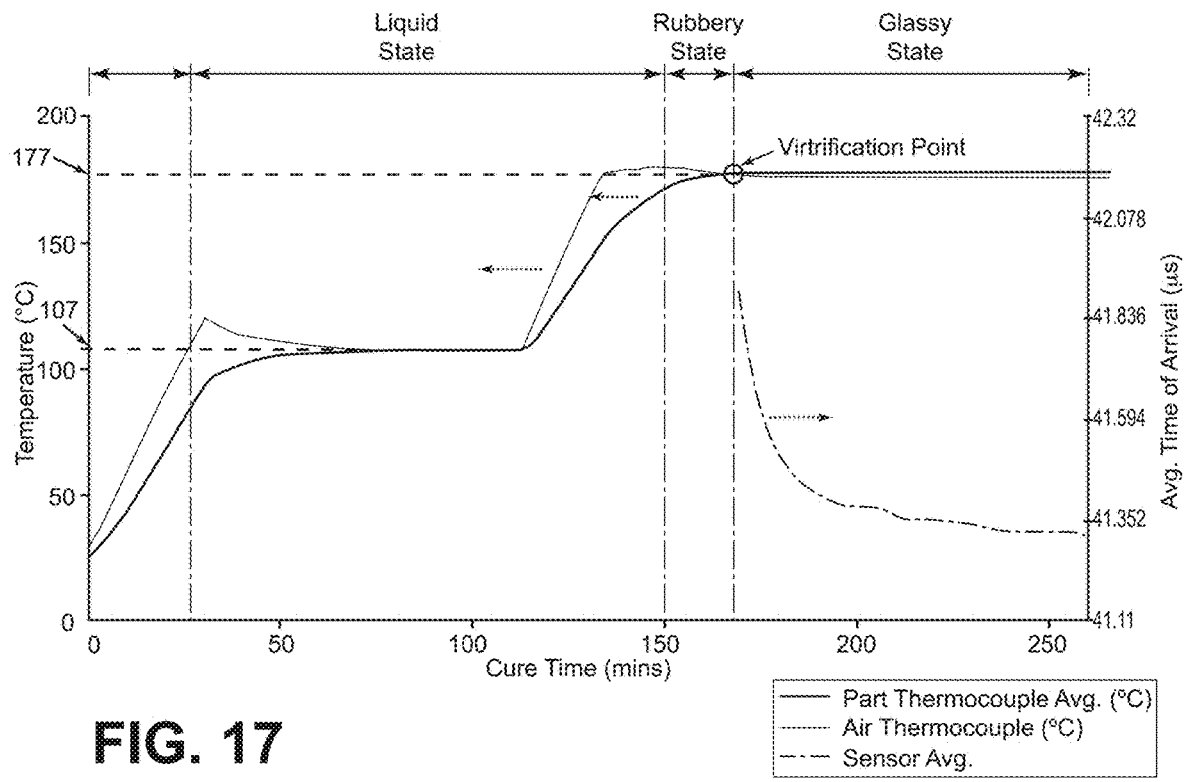
FIG. 17 is a graph showing average time of arrival for six excitation center frequencies (80, 100, 150, 200, 250, and 300 kHz) (Experiment 1)
Figure 18:
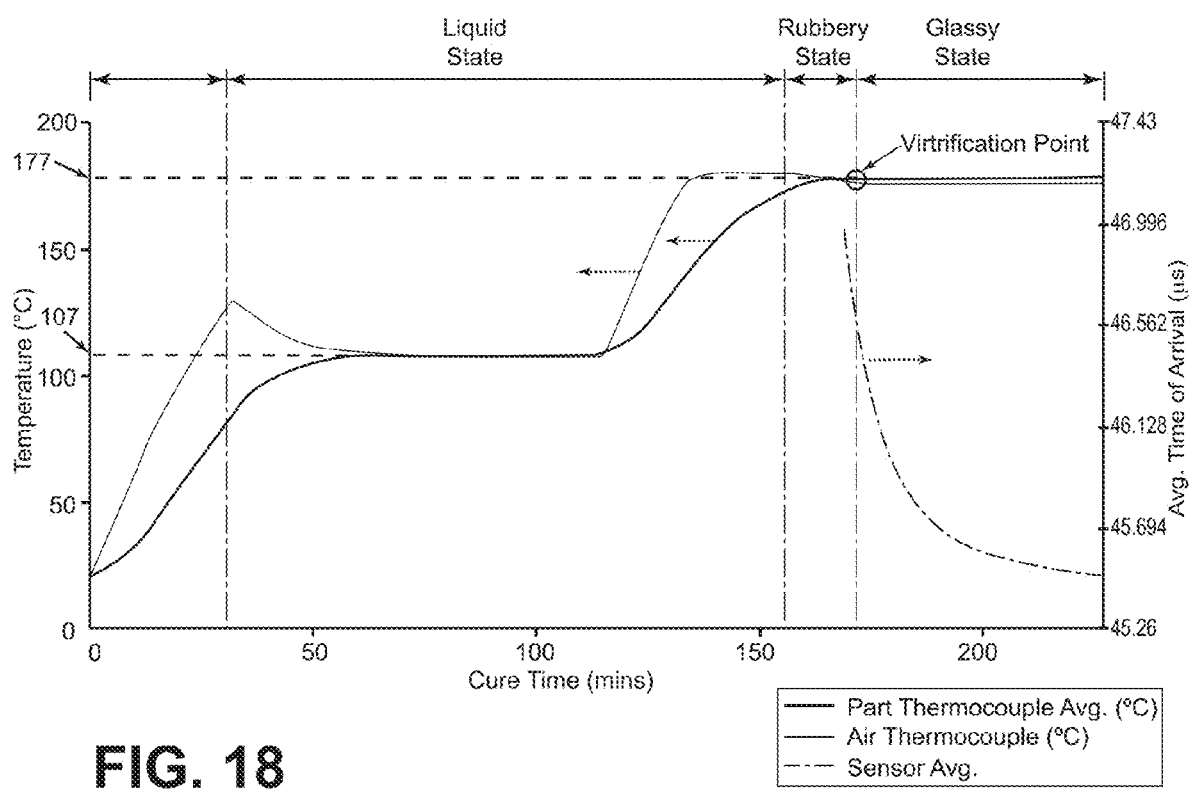
FIG. 18 is a graph showing average time of arrival for six excitation center frequencies (80, 100, 150, 200, 250, and 300 kHz) (Experiment 2)

The average TOA for the six excitation center frequencies (80, 100, 150, 200, 250, and 300 kHz) are shown in FIGS. 17 and 18 for Experiment 1 and 2, respectively.

As expected, it was noticed that the further away the piezoelectric actuator 8 was from the sensor 2 the longer the waves took to reach the sensor 2. Also as expected, the orientation of the panel 4 affected the TOA for the wave. Guided waves travel quicker in the carbon fiber direction compared to traveling normal to the carbon fibers due to the higher elastic modulus in the carbon fiber direction.

For each experiment, the average TOA of the waves decreased as the composite entered its glassy state. The initial point at which the TOA can be determined (during the 177° C. temperature hold) occurred near the vitrification point of the composite. In addition, the average TOA was inversely proportional to the degree of cure predictions from the semi-empirical model simulations.

When using a multiplexed setup of FBG sensors 2, it is possible to calculate the group velocity of the waves (FIG. 17A) based on the time of arrival to various locations within the composite (each of the individual sensors 2). First, the time of arrival to each sensor 2 was calculated for every actuation frequency. The group velocity of the waves was then calculated for every frequency based on a linear fit between time of arrival and sensor location, x, for every sensor in a multiplexed optical fiber. The slope of this fit is the group velocity, $c_g$, [Eq. (1.10)].

$$x = c_g \times TOA + B \qquad (1.10)$$

where B is a constant of the linear fit.

The group velocity was then averaged across all center actuation frequencies at the defined cure times [Eq. (1.11)]. As with peak voltage and TOA, the group velocity values were first interpolated at defined cure times since measurements at different actuation center frequencies occur at slightly different cure times. After averaging, the group velocity was then normalized by dividing all averaged group velocity values by the highest average group velocity value [Eq. (1.12)].

$$c_{g,avg}(CT) = \frac{1}{p}\sum_{k=1}^{p} c_g(CT, f_{c_k}) \qquad (1.11)$$

$$c_{g,norm,avg}(CT) = \frac{c_{g,avg}(CT)}{\max[c_{g,avg}(CT)]} \qquad (1.12)$$

Figure 17A:
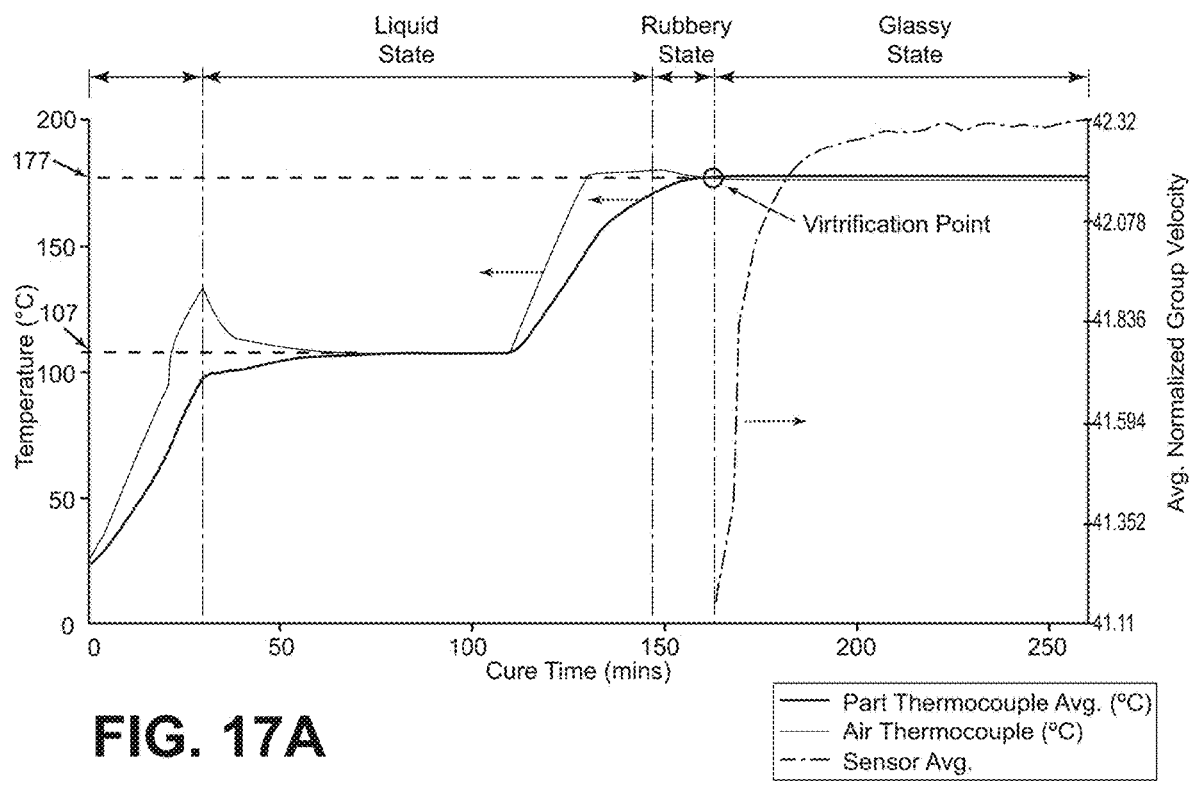
FIG. 17A shows group velocity.

With reference to FIG. 17A, group velocity (inversely proportional to average TOA) directly correlated with the degree of cure predictions from the semi-empirical model simulations. Group velocity can also be connected to the mechanical properties of the composite as it strengthens during the cure cycle. Similar to time of arrival, the beginning point at which the group can be determined during the 177° C. occurred shortly after vitrification of the composite. Again, this measurement can be utilized to identify that vitrification has recently occurred. As was the case for amplitude, the group velocity data from Experiment 12 suggested the panel vitrified later than the predicted time from simulation.

Figure 19:
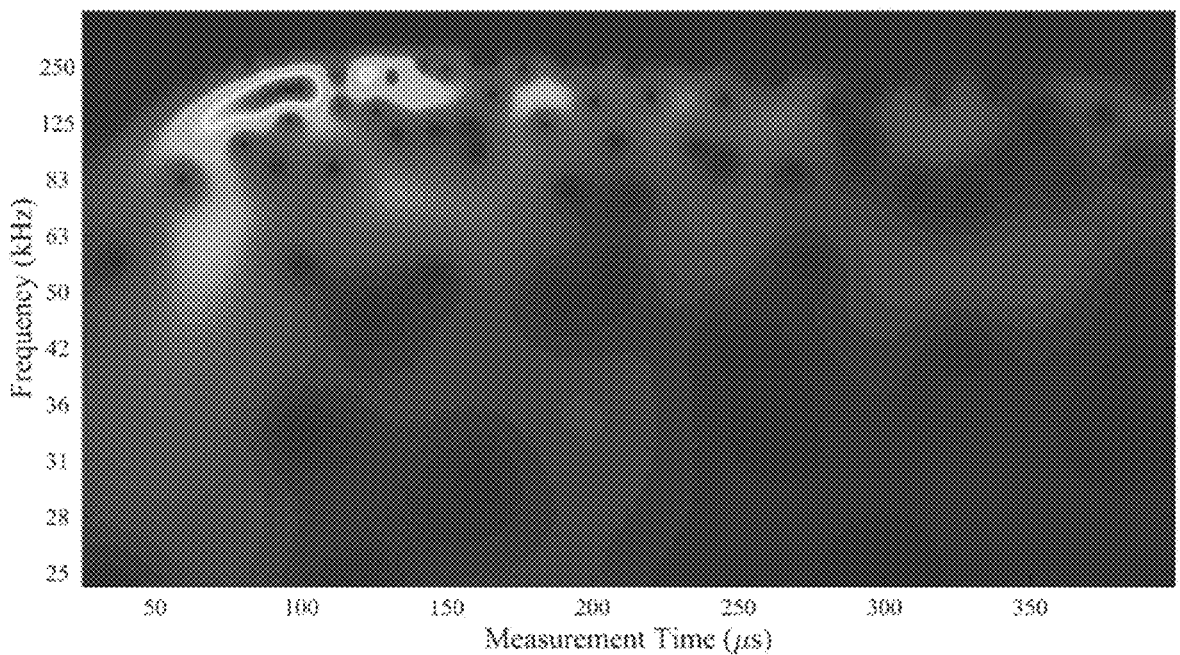
FIG. 19 shows the time-frequency analysis of the recorded signal for 5-460 kHz linear chirp waveform actuation recorded by Sensor Two at a cure time of 275 minutes (Experiment 10)

As previously noted, the chirp waveform sweeps a range of frequencies rather than being run at a single center frequency. By employing a continuous wavelet transform using the Gabor wavelet, the data can be discretized based on frequency. Though all frequencies within the range used to construct the chirp waveform are excited within the time bounds of the chirp, not all frequencies prompt the same panel response. The time-frequency analysis of a single recorded waveform is shown in FIG. 19.

To find the maximum amplitude of the guided wave-based signals throughout cure and its associated frequency, [Eq. (1.13)] may be utilized $$[fA_{max}(CT_i,x_j),A_{max}(CT_i,x_j)]=\max|A_{cwt}(CT_i,x_j,t_l,f)| \quad (1.13)$$

where $fA_{max}$ is the frequency at maximum amplitude ($fA_{max}$=179 kHz in FIG. 19), $A_{max}$ is the maximum amplitude of the signal using the continuous wavelet transformation, $A_{cwt}$ is the continuous wavelet transformation of the measured signal, and $CT_i$, $x_j$, $t_l$, and $f$ denote the discrete cure time, location (i.e., sensor), measurement time, and frequency, respectively.

Figure 20:
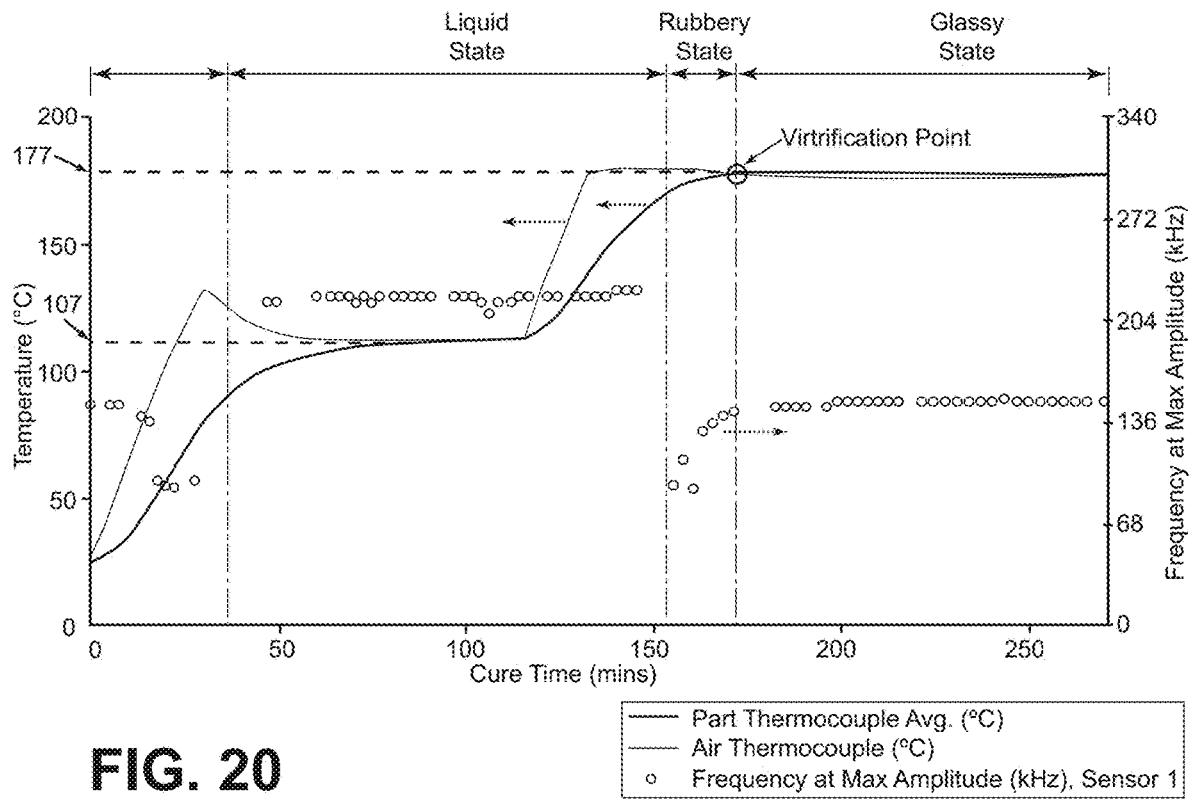
FIG. 20 is a graph showing frequency corresponding to maximum amplitude at Sensor One for a 5-460 kHz chirp waveform throughout cure until cool down (Experiment 10)
Figure 21:
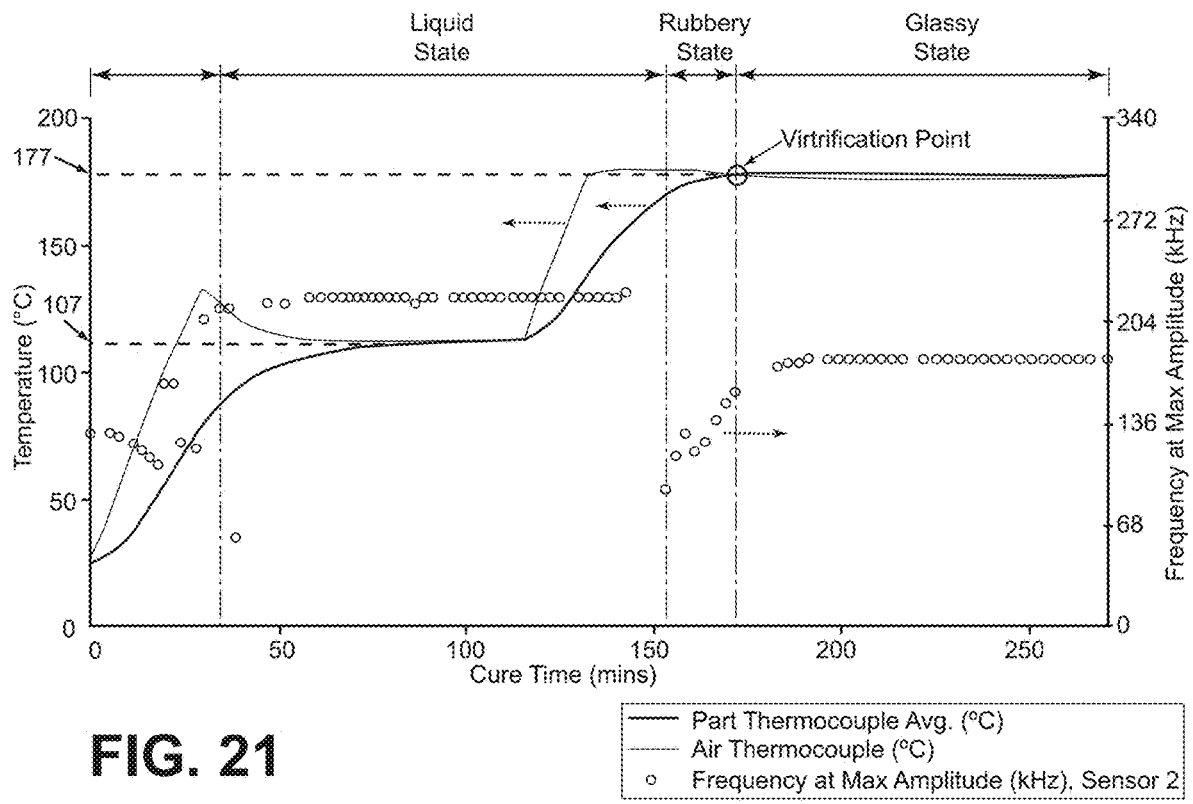
FIG. 21 is a graph showing frequency corresponding to maximum amplitude at Sensor Two for a 5-460 kHz chirp waveform throughout cure until cool down (Experiment 10)
Figure 22:
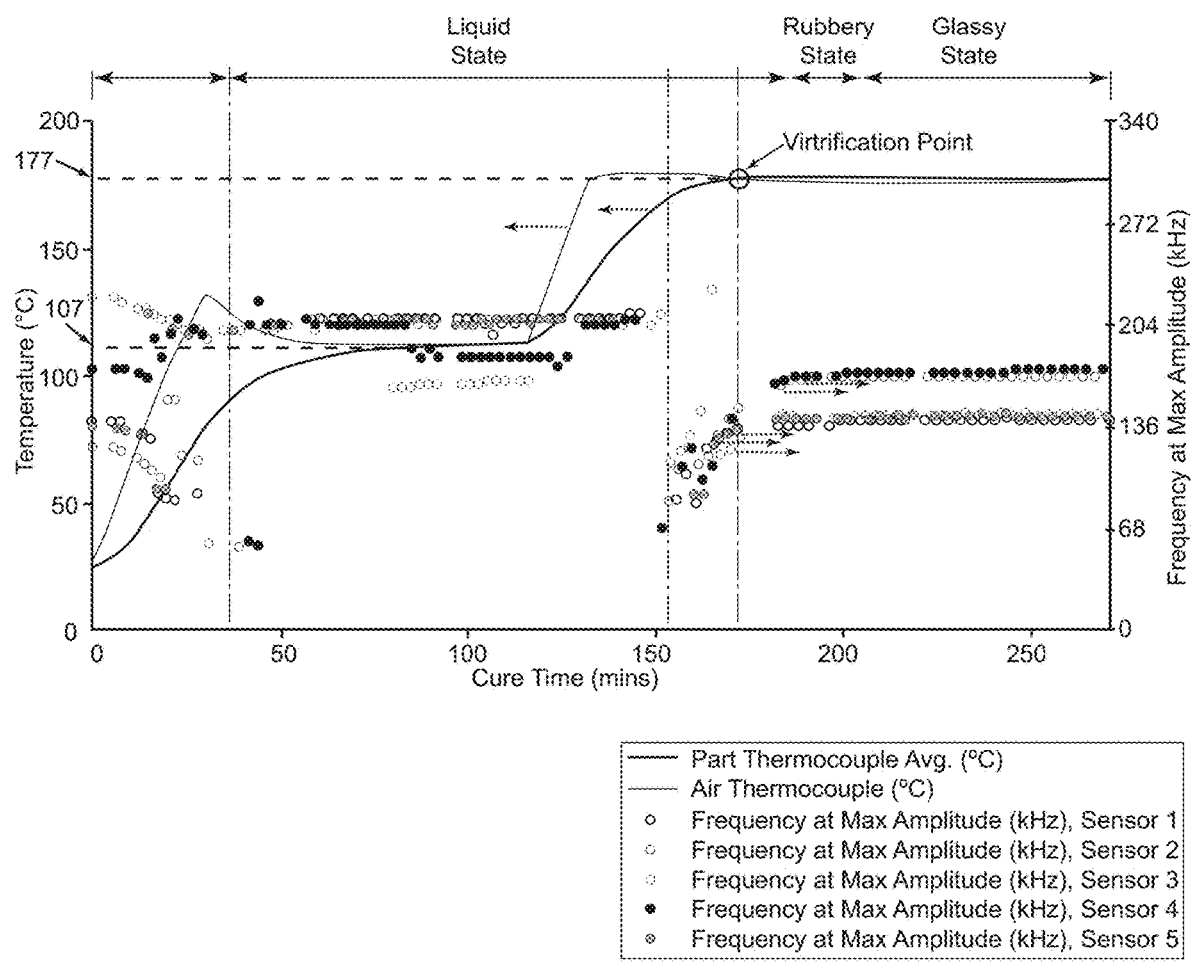
FIG. 22 is a graph showing frequency corresponding to maximum amplitude at all 5 sensors for a 5-460 kHz chirp waveform throughout cure until cool down (Experiment 10)

The outputs of this function can be used to construct plots of frequency at which maximum amplitude occurred throughout the cure cycle. FIG. 20 shows the frequency associated with maximum amplitude measured by Sensor One, FIG. 21 is the associated plot for Sensor Two, and FIG. 22 is a plot for all five FBG sensors 2 (all from Experiment 10).

A distinct trend was observed in the frequency at maximum amplitude in relation to the state of the curing composite. At the beginning of cure, the frequency at maximum amplitude decreased. At the onset of the liquid state, the frequency at maximum amplitude leveled off and remained constant through most of this phase. During gelation, the frequency at maximum amplitude abruptly decreased and then increased through the rubber phase. As the composite transitioned to the glassy state (vitrification), the frequency at maximum amplitude plateaued again.

Figure 23:
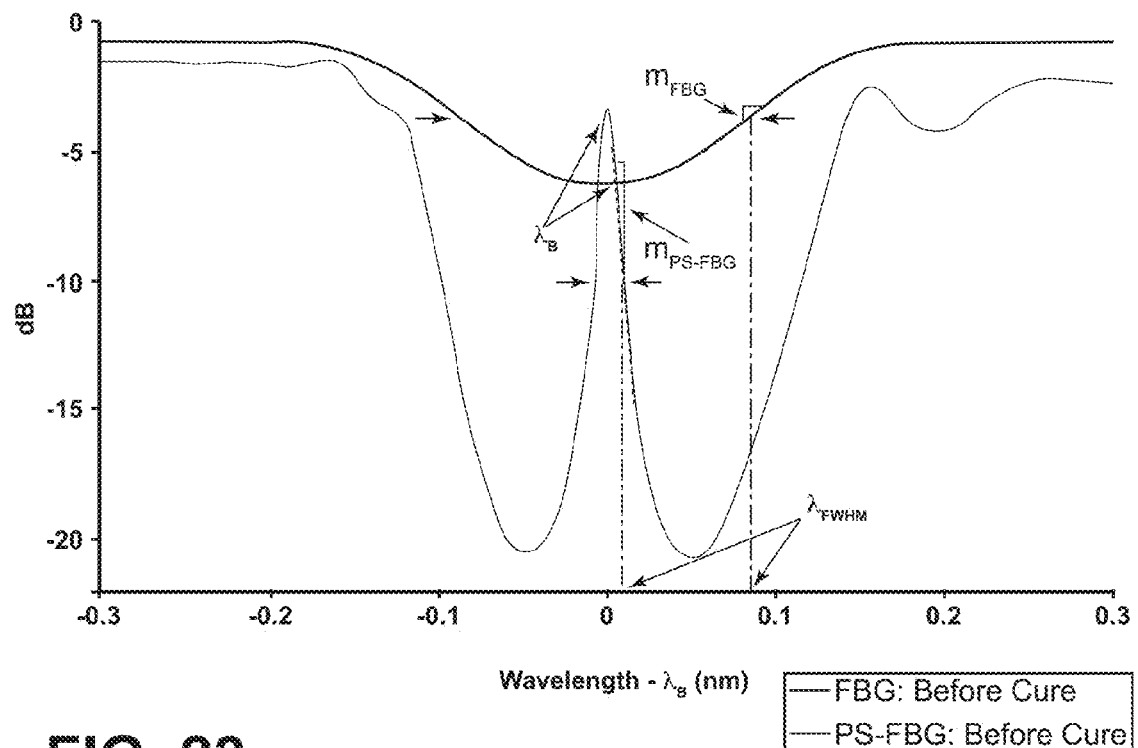
FIG. 23 is a graph showing comparison of FBG and PS-FBG spectrums before cure (Experiments 4 and 5)

A comparison between a conventional FBG and a PS-FBG was made in Experiments 4 and 5. For guided wave-based sensing, the PS-FBG provide greater sensitivity than traditional FBG due to the steeper slope, $m_{FBG(PS-FBG)}$, at the FWHM wavelength (FIG. 23). The steeper slope caused the same change in x (shift of spectrum due to wave passing the sensor) to result in a higher change in y (optical power) for the PS-FBG.

Testing showed that PS-FBG sensors have a significant advantage compared to FBG sensors. This advantage was clear from the change in power each sensor records from the waves. The change in power of a conventional FBG (Experiment 4) was two orders of magnitude lower than the PS-FBG.

The SNR for the PS-FBG was also greater than that of the conventional FBG. Also, at 250 kHz excitation the $S_0$ wave mode was not captured with the conventional FBG but was captured by the PS-FBG. This was also true for 200 kHz and 300 kHz excitation.

Figure 24:
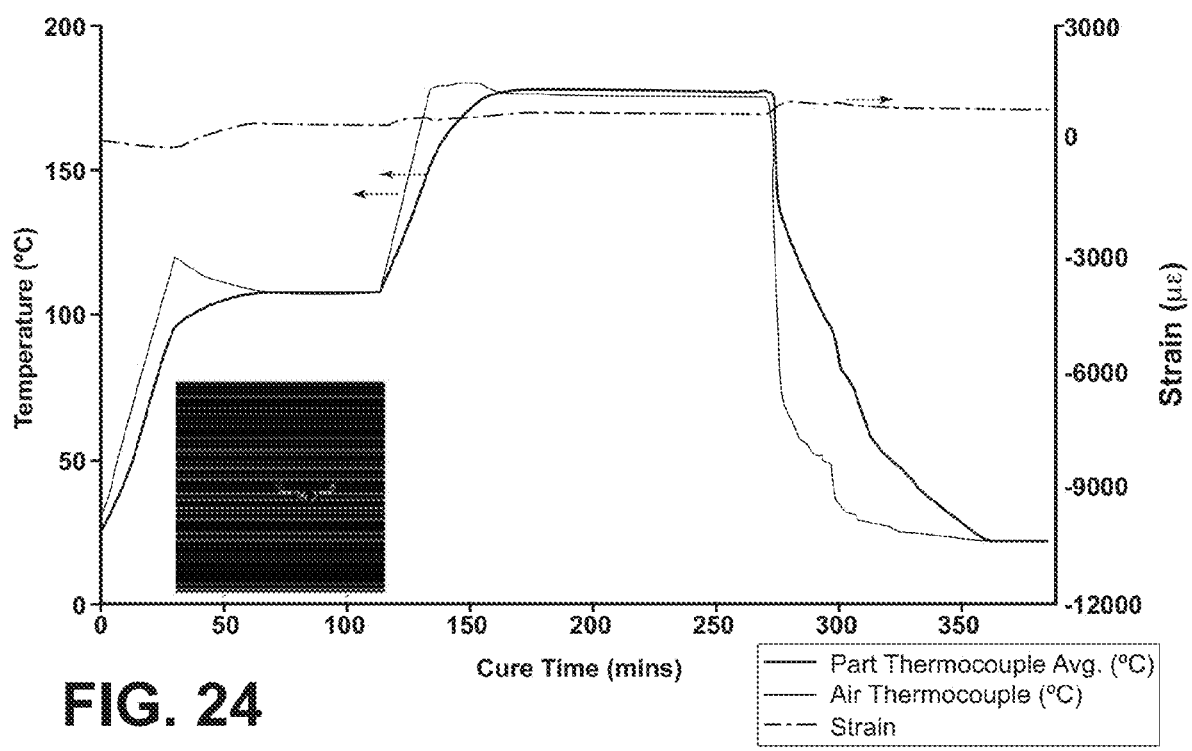
FIG. 24 is a graph showing strain measured by a PS-FBG throughout cure (Experiment 1)
Figure 25:
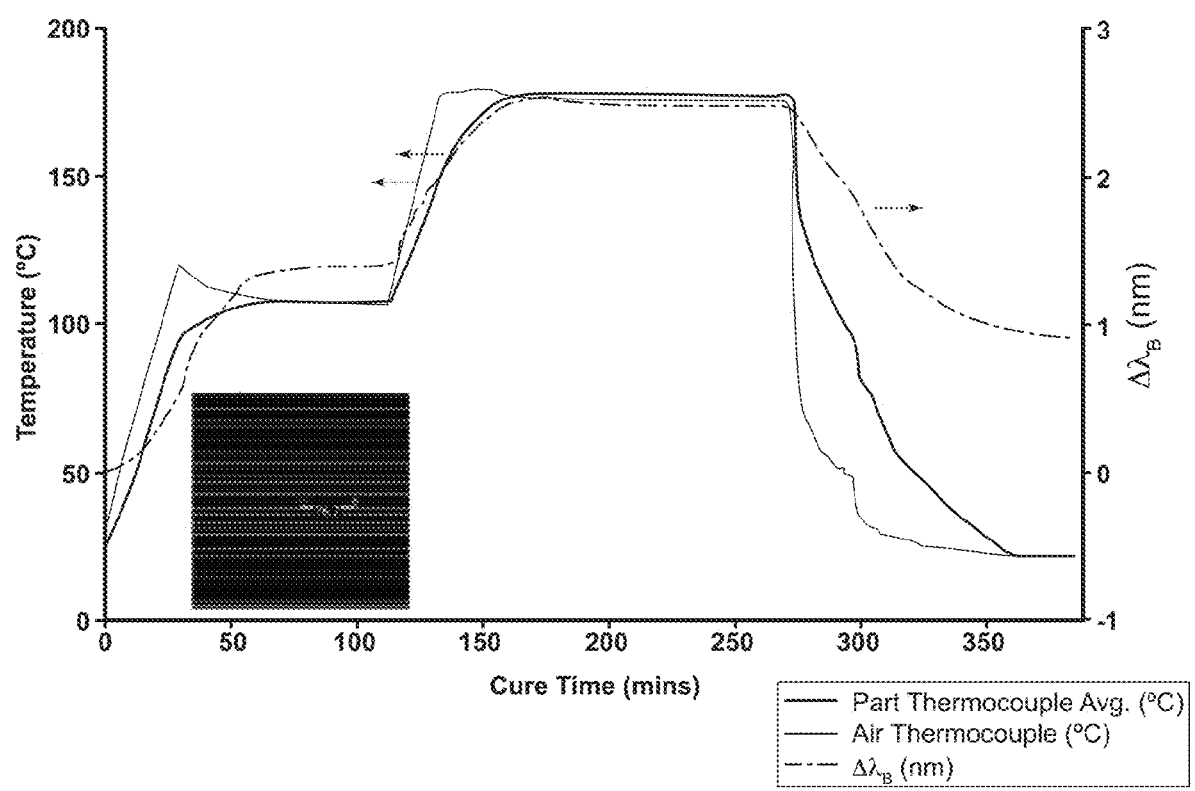
FIG. 25 is a graph showing change in wavelength of embedded PS-FBG (Experiment 1)

FIGS. 24 and 25 show the strain, and associated $\Delta\lambda_B$, respectively, undergone by the embedded sensor 2 throughout the cure cycle for Experiment 1. For the Experiment 1, the sensor 2 was placed in the carbon fiber direction resulting in a small tensile strain at the end of the cure as seen in FIG. 24.

For the second experiment, the strain (not shown) varied slightly due to the quasi-isotropic setup. Also, the calculation of strain during cool down fluctuated due to a fan placed over the part, and removed at some points, to cause a faster cooling rate.

The strain results of Experiment 3 were slightly less than that of Experiment 1. This may be due to the PS-FBG being placed between plies fourteen and fifteen compared to plies eighteen and nineteen of Experiment 1. The smaller strain is expected to result from the sensor 2 being closer to the steel tool plate 12 in this case, because the tool plate 12 constricts the movement of the composite part 4. Thus, the strain increased with distance from the tool plate 12.

The fiber optic sensor in Experiments 4 and 5 was oriented perpendicular to the carbon fiber direction, thus resulting in similar compressive strain (composites typically shrink orthogonal to carbon fiber direction due to resin shrinkage during cure and during cool down). The magnitude of the compressive strain normal to the carbon fiber direction was much higher than the tensile strain along the carbon fiber direction in the unidirectional laminates and quasi-isotropic laminate (composites are typically much stronger along the carbon fiber direction than normal to it).

Strain and $\Delta\lambda_B$ for the complex contour structure 4 with the optical fiber 30 normal to the carbon fiber (Experiment 6) was also determined. The compressive strain of the complex structure 4 was greater than that of the flat composites whose optical sensor also lies normal to the carbon fiber direction (Experiments 4 and 5).

In Experiment 7, a single FBG sensor 2 was embedded parallel to the carbon fiber in a unidirectional layup in a curved structure 4. The strain in Experiment 7 was similar to Experiments 1 and 3 where the optical fiber 30 was also embedded parallel to the carbon fiber in unidirectional layup in a flat panel 4.

Experiments 8-12 had a multiplexed FBGs setup with either five or two (Experiment 11) FBGs along the same optical fiber 30. As an intermediate step in the strain calculation, the change in wavelength values, $\Delta\lambda_B$, are matched together at gelation (the time at which the strain in the composite begins to be transferred into the optical fiber). It should be noted that the strain presented from all experiments was the strain in the optical fiber. The strain transfer from the composite to the optical fiber primarily occurs post-gelation.

In Experiments 8-10, the strain throughout the cure cycle followed the same general trend as Experiment 2 where the optical fiber embedded parallel to the carbon fiber direction in a quasi-isotropic layup.

Experiment 11 was similar to Experiments 2, 8, 9, and 10 with a quasi-isotropic layup, but with two sensors 2 (due to fiber breaking at egress of composite) and in a curved structure 4.

The strain in all five sensors in Experiment 12 followed the trend of Experiments 4 and 5 where the optical fiber was embedded perpendicular the carbon fiber direction in a flat panel 4. The strain in Sensor Three differed from the other sensors due to its location directly underneath the piezoelectric actuator 8 which affected the local strain field.

Figure 26:
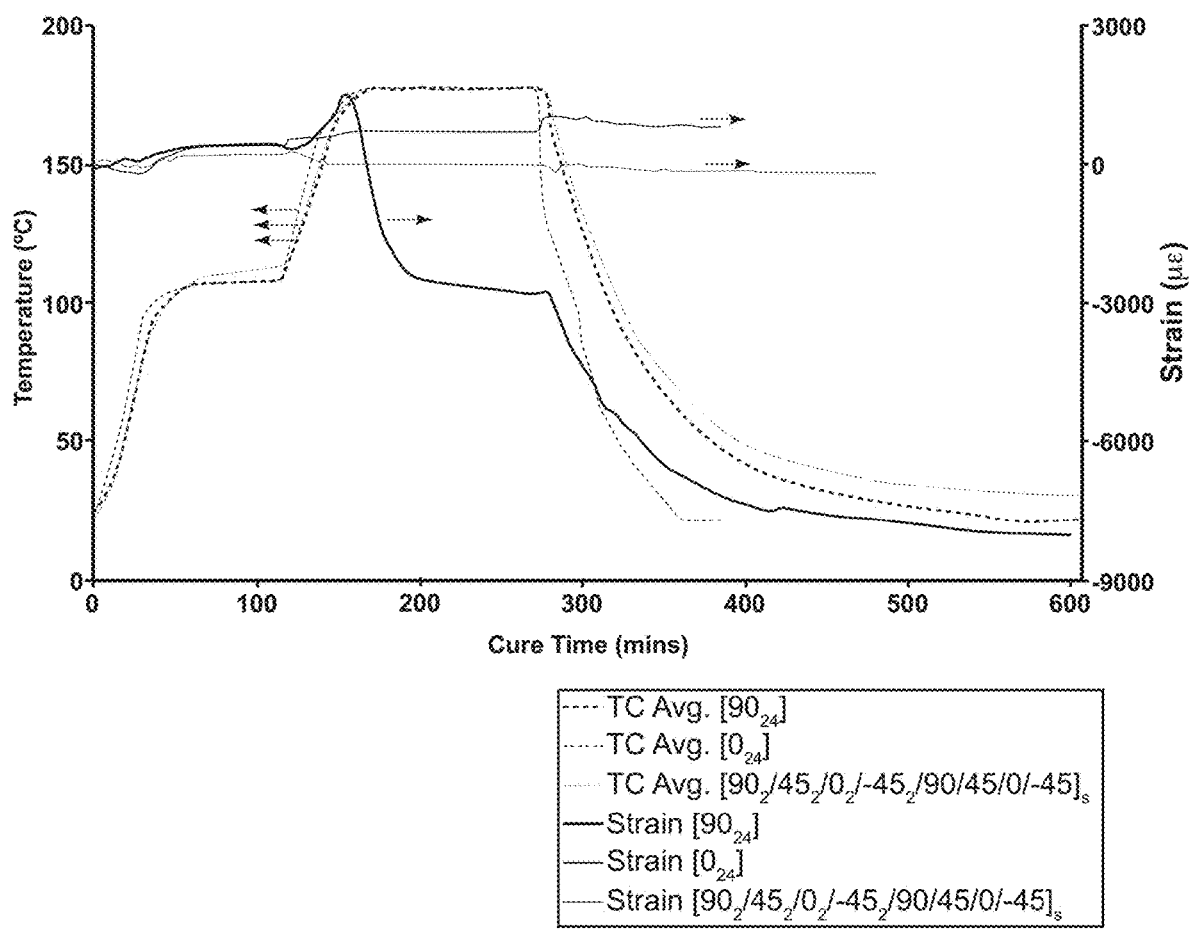
FIG. 26 is a graph showing strain normal to carbon fiber in unidirectional layup ($[90]_{24}$ for Experiment 12, Sensor Four), strain parallel to carbon fiber in unidirectional layup ($[0]_{24}$ for Experiment 1, Sensor One), and strain parallel to zero degree plies within quasi-isotropic layup ($[90_2/45_2/0_2/-45_2/90/45/0/-45]_s$ for Experiment 10, Sensor Four)

FIG. 26 gives a comparison among three different experiments. In FIG. 26, for the composite layup of $[90]_{24}$ (Experiment 12), the optical fiber 30 is oriented normal to the carbon fiber, for the composite layup of [0]24 (Experiment 1), the optical fiber 30 runs parallel to the carbon fiber, and for the quasi-isotropic composite layup of $[90_2/45_2/0_2/-45_2/90/45/0/-45]_s$ (Experiment 10), the optical fiber 30 runs parallel to the zero degree plies within the panel. As expected, the residual strain present in Experiment 12 was of a far greater magnitude compared to the residual strain in Experiment 1 and Experiment 10, indicating much higher residual strain normal to the carbon fiber versus parallel to the carbon fiber in unidirectional and quasi-isotropic layups.

In summary, residual strain was observed for the embedded PS-FBGs and traditional FBGs. The residual strain resulted primarily from two sources: 1) chemical cure shrinkage strain; and 2) coefficient of thermal expansion (CTE) strain. CTE strain primarily results from cooling of a composite (i.e., a composite vitrifies at high temperature then cools to room temperature). It may also arise due to the mechanical boundary conditions such as CTE mismatch between the tool and the composite.

Figure 27:
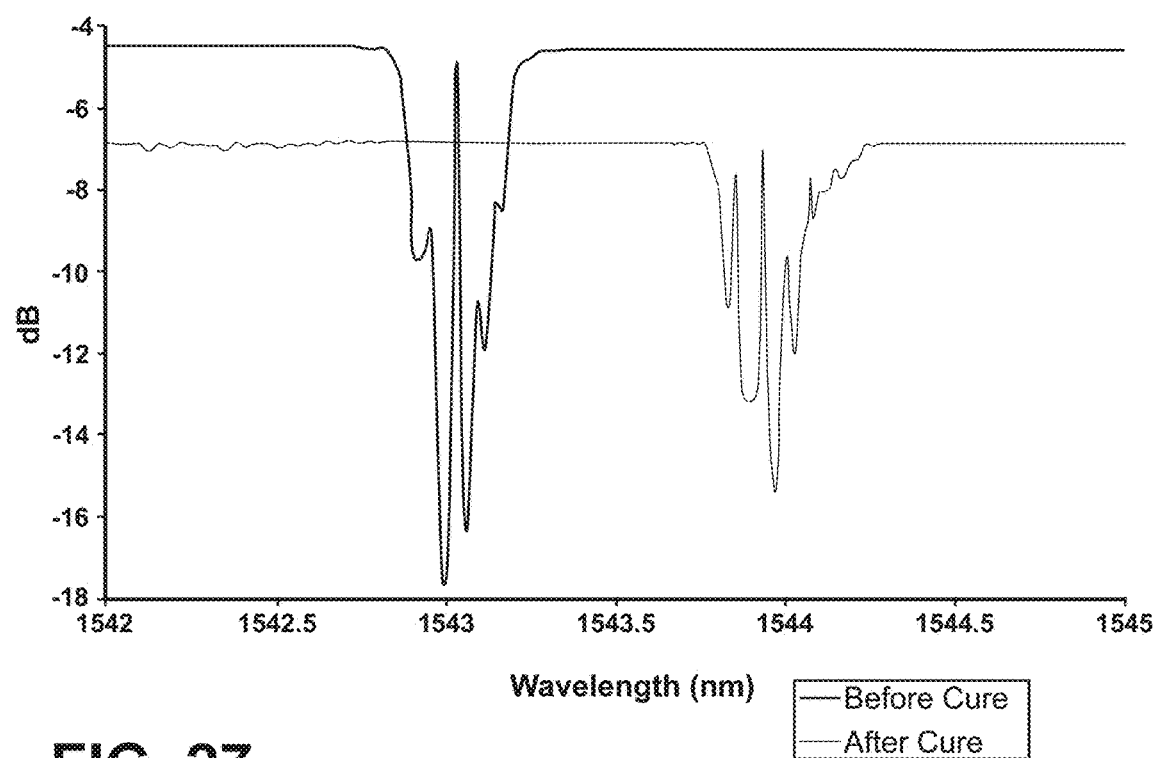
FIG. 27 is a graph showing transmitted spectrum of a PS-FBG before and after cure (Experiment 1)
Figure 28:
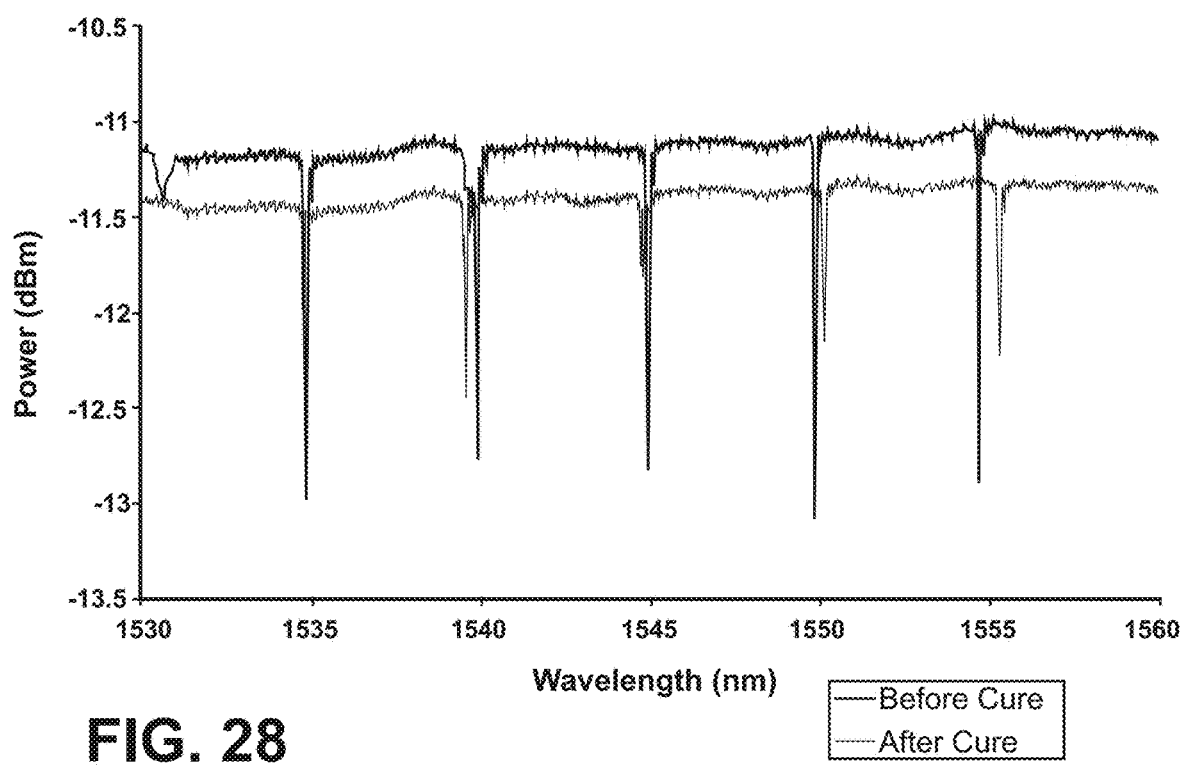
FIG. 28 is a graph showing transmitted spectrum of multiplexed FBGs before and after cure (Experiment 8).

The reflected and/or transmitted spectrum for Experiment 1 is shown in FIG. 27. Experiments 1,3-6,8-9, and 12 were run in the transmitted spectrum and Experiments 2, 10, and 11 were run in the reflective spectrum due to the optical fiber breaking at the egress of the composite. Experiment 7 began in the transmitted spectrum and was switched to the reflected spectrum during cure. The system can run all measurements using the transmitted or reflected spectrum. In general, the reflected spectrum was not as clean as the transmitted spectrum, especially when using a PS-FBG (e.g., Experiment 2), thus requiring a robust algorithm to determine AB and the FWHM wavelength. However, the reflected spectrum still provided viable and accurate strain data and guided wave-based measurements. FIG. 27 shows a reflected/transmitted spectrum for a single FBG/PS-FBG (Experiments 1) while FIG. 28 shows the reflected/transmitted spectrums of multiplexed FBGs (Experiments 8).

The spectrums for Experiments 1-7 were recorded as a dB gain/loss based on a baseline measurement without the FBG/PS-FBG sensor 2 whereas the spectrums for Experiments 8-12 were recorded as the total power in dBm.

The optical fiber spectrums changed from the beginning to the end of the cure resulting in a reduction of light reflected/filtered by the FBG/PS-FBG and the potential for double and/or additional peaks. The formation of additional peaks within the sensors' spectrum evolved over time during the cure cycle. It was observed that this phenomenon occurred primarily during the cool down stage of the cure cycle and was most significant when the optical fiber 30 was embedded perpendicular to the carbon fiber. Non-axial residual strain is considered the most likely cause of the extra peaks.

The spectrum of filtered light by Sensor Three in Experiment 12 was significantly smaller than Sensors One, Two, Four, and Five. The reason for this was Sensor Three was located directly underneath the piezoelectric actuator 6 which caused non-uniform strain over the grating.

A cure monitoring system according to the present disclosure may employ high-temperature piezoelectric actuator 6 and FBGs and/or PS-FBGs 2 to interrogate composite panels (pats) during cure. The guided wave-based measurement trends for the average normalized peak change in power (amplitude), TOA, and group velocity correlated with the simulation predictions of the cure kinetics using a known semi-empirical material model (e.g., RAVEN®). The semi-empirical material model was based on data from experimental material characterization tests (e.g., DSC, rheology). From the guided wave-based measurements, the phase transitions (gelation and vitrification) can be identified and a metric for degree of cure was presented and the connection made to the mechanical properties of the composite.

The system and process of the present disclosure may be used to dynamically control the cure cycle in a closed-loop process to maximize composite part quality and consistency. This is feasible because the acquisition and analysis of the guided wave-based signals may be done simultaneously or almost simultaneously in real-time during cure. The guided wave-based system 1 may be incorporated directly into standard curing equipment and technique. The system 1 is scalable from producing flat composite panels to full-scale complex structures (e.g., cylinders/barrels, wing skins, etc.) as demonstrated on curved test panels 4C.

During testing, PS-FBGs provided a much higher resolution for performing wave measurements compared to conventional FBG sensors. This was due to the greater change in power of the PS-FBGs compared to conventional PS-FBGs under identical conditions allowing for a higher SNR. A higher SNR for the PS-FBG increases the distance at which a wave mode can be detected, enhances the ability to sense all wave modes (e.g., $S_0$, $A_0$), and increases the probability of collecting data throughout the entire cure cycle (liquid, rubbery, and glassy states). However, it will be understood that the present disclosure is not limited to PS-FBGs, and conventional FBG sensors may be utilized if conventional FBGs are more suitable for a particular application due to cost or technical issues.

Multiplexing (using multiple FBGs along the same optical fiber) permits group velocity to be calculated based on information extracted from time of arrival and propagation distance for each FBG (or PS-FBG) sensor in use. In addition, because of multiplexing, quasi-static strain data from multiple locations within a composite structure may be measured/recorded. This may be important for usage/loads monitoring because different areas within a composite structure may have different strains due to different stresses.

The type of actuation waveform utilized in the system impacts post-processing requirements as well as the metrics that can be calculated. The system described above can handle toneburst waveforms, run at a single center frequency, as well as the chirp waveform, which sweeps through a range of frequencies. Waveforms such as the five-cycle, Hanning windowed, sinusoidal toneburst may require center frequency specification before experimentation. For the chirp waveform, cure response data from individual frequencies within the sweep range may be extracted during post-processing by time-frequency analysis using a continuous wavelet transform with the Gabor wavelet. Advantages of the chirp waveform include data collection speed, ability to access data from a range of frequencies rather than being bound by input frequencies, and ability to study new relationships such as frequency at maximum amplitude versus cure time. The frequency corresponding to maximum amplitude throughout cure for the chirp signal yielded results with a distinct trend based on the resin state in the composite. Challenges of using the chirp waveform include post-processing complexity and speed, a complex dispersion relationship, and the inability to accurately determine the time of arrival in some cases.

A fiber optic sensor system according to the present disclosure may provide for multiplexing, embedding in a composite, utilization in harsh environments, electrically passive operation, electromagnetic interference (EMI) immunity, and life-cycle monitoring (made possible because of embedment into the structure), and others. Additional advantages of fiber optic sensors such as conventional FBGs and PS-FBGs are their light weight construction as well as compactness. During life-cycle monitoring, the embedded (or surface mounted) fiber optic sensors may be utilized for both loads monitoring (because of ability to measure strain) and damage detection (because of ability to record ultrasonic, guided waves). Implementing a system/process according to the present disclosure in composite parts, such as aircrafts, as soon as layup occurs may provide for early defect detection and repair, potentially reducing the time required for the development and certification of advanced composite structures. A system/process according to the present disclosure may provide a cost effective and accurate method for cure monitoring during production and structural health monitoring during the life-cycle of the part.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments can be performed in any order. Words such as "thereafter," "then," "next," etc. are not intended to limit the order of the operations; these words are simply used to guide the reader through the description of the methods. Further, the terms "first," "second," and the like herein do not denote any order, quantity, or importance, but rather are used to distinguish one element from another.

The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of in-process cure monitoring of a material, the method comprising;
    embedding at least one sensor selected from the group consisting of fiber Bragg gratings (FBGS) and phase-shifted FBGS (PS-FBGS) at a first location, and at least one optical line that is operatively connected to the sensor, into the material to be cured;
    exciting waves into the material during curing of the material at a second location that is spaced apart from the first location to form guided waves that propagate through the material from the second location to the first location;
    causing light to propagate through the optical line to the sensor; and
    measuring at least one wave metric of the guided waves at the first location by utilizing the sensor receiving the propagated light, including measuring a wavelength spectrum oscillation to determine local strain resulting from the guided waves at the first location induced by the guided waves propagating through the material; and
    measuring chemical cure shrinkage strain by utilizing the sensor, wherein the chemical cure shrinkage strain is induced by curing of the material.

2. The method of claim 1, wherein the at least one sensor comprises a plurality of sensors.

3. The method of claim 1, further comprising utilizing the at least one measured wave metric to determine information for at least one of
    a phase transition of the material; and
    a material property of the material.

4. The method of claim 1, wherein
    measuring the at least one wave metric includes measuring at least one of
        a time of arrival of the guided waves at the second location; and
        an amplitude of the guided waves at the second location.

5. The method of claim 1, further comprising
    measuring at least one wave metric of the material at a third location that is spaced apart from the first location and the second location;
    determining a group velocity for guided waves between the second and third locations;
    utilizing the group velocity to determine a mechanical property of the material.

6. The method of claim 1, wherein
    exciting at least one wave into the material during curing of the material comprises
    exciting guided waves having at least first and second center frequencies, and wherein
    the first center frequency is not equal to the second center frequency.

7. The method of claim 1, wherein
    the material comprises a thermosetting polymer; and
    the curing process comprises heating or cooling the thermosetting polymer material to a prescribed temperature.

8. The method of claim 1, further comprising
    adjusting at least one parameter of the curing process based, at least in part, on a wave metric measured at the second location.

9. The method of claim 3, wherein
    the material property comprises at least one of viscosity, degree of cure, cure rate, and mechanical properties.

10. The method of claim 1, wherein
    the measured wave metric comprises a measured wave amplitude at the second location.

11. The method of claim 1, further comprising
comparing a measured wave amplitude to an expected wave amplitude;
adjusting at least one process parameter of the curing process based on differences between the measured wave amplitude and the expected wave amplitude.

12. The method of claim 11, wherein
the at least one process parameter of the curing process is selected from the group consisting of a temperature, pressure, and time at an elevated temperature.

13. The method of claim 1,
wherein the wave metric comprises time of arrival at the second location; and further comprising
comparing the measured time of arrival to an expected time of arrival to determine a difference;
adjusting at least one curing process parameter based, at least in part on the difference.

14. The method of claim 1, further comprising
utilizing empirical data to determine a correlation between the measured wave metric and a cure state of the material.

15. The method of claim 1,
wherein the material comprises a multi-layer sheet of fiber reinforced polymer matrix material having opposite first and second side surfaces forming acoustic boundaries; and
further comprising
positioning the fiber reinforced polymer matrix material on a support surface with the second side surface facing the support surface;
positioning an actuator on the first or second side of the fiber reinforced polymer matrix at the first location;
embedding the optical line and a plurality of the sensors in the fiber reinforced polymer matrix material prior to curing the fiber reinforced polymer matrix material.

16. A method of in-process cure monitoring of a material, the method comprising
operatively connecting at least one optical sensor to a fiber reinforced composite material at a first location, wherein the optical sensor is a phase-shifted fiber Bragg grating that reflects predefined wavelengths of light and transmits all other wavelengths of light;
operatively connecting at least one optical line to the optical sensor;
exciting waves into the fiber reinforced composite material during curing of the composite material at a second location that is spaced apart from the first location to form guided waves that propagate through the composite material from the second location to the first location;
causing light to propagate through the optical line to the sensor; and
measuring at least one wave metric of the guided waves at the first location utilizing the optical sensor receiving the propagated light, including measuring a wavelength spectrum oscillation to determine local strain resulting from the guided waves at the first location line induced by the guided waves propagating through the material; and
measuring chemical cure shrinkage strain by utilizing the sensor, wherein the chemical cure shrinkage strain is induced by curing of the material.

17. The method of claim 16, wherein
the at least one optical sensor is configured to reflect and/or filter light having predefined wavelengths.

18. The method of claim 16, further comprising
utilizing the measured wave matric to determine information concerning at least one of
a phase transition of the fiber reinforced composite material; and
a material property of the fiber reinforced composite material.

19. The method of claim 16, wherein
measuring at least one wave metric includes measuring at least one of
a time of arrival of the guided waves at the second location; and
an amplitude of the guided waves at the second location.

20. The method of claim 16, wherein
the optical sensor is bonded to a surface of the fiber reinforced composite material prior to curing.

* * * * *